United States Patent [19]
Kobayashi

[11] Patent Number: 5,222,214
[45] Date of Patent: Jun. 22, 1993

[54] IMAGE PROCESSING USING A RAM AND REPEAT READ-MODIFY-WRITE OPERATION

[75] Inventor: Yoshinao Kobayashi, Hiratsuka, Japan

[73] Assignee: International Business Machines Corporation, Armonk, N.Y.

[21] Appl. No.: 543,315

[22] Filed: Jun. 25, 1990

[30] Foreign Application Priority Data

Jun. 29, 1989 [JP] Japan ................. 1-165512

[51] Int. Cl.⁵ .............. G06F 15/20; G09G 1/02
[52] U.S. Cl. .................... 395/164; 395/143; 395/162; 340/799
[58] Field of Search ............ 395/143, 162, 164, 166; 340/727, 798, 799

[56] References Cited

U.S. PATENT DOCUMENTS

| 4,779,223 | 10/1988 | Asai et al. | 395/425 |
| 4,827,249 | 5/1989 | Chauvel et al. | 340/799 |

Primary Examiner—Dale M. Shaw
Assistant Examiner—Kee M. Tung
Attorney, Agent, or Firm—Thomas P. Dowd

[57] ABSTRACT

An image processing system adaptable to pattern recognition that can serve any image width using a minimum of additional hardware by constructing a line buffer using a RAM and filling the RAM with image data while repeating the RMW (Read-Modify-Write) operation. To increase the processing speed, data packing of the line buffer (RAM) is performed on a multiple-bit basis rather than a bit-by-bit basis, that is, the number of bits written into the line buffer by one RMW operation is increased, for example, to 2, 4, or 8, so that the processing speed can be increased accordingly. An appropriate mask processing system is disclosed for processing the data so packed in the line buffer.

20 Claims, 26 Drawing Sheets

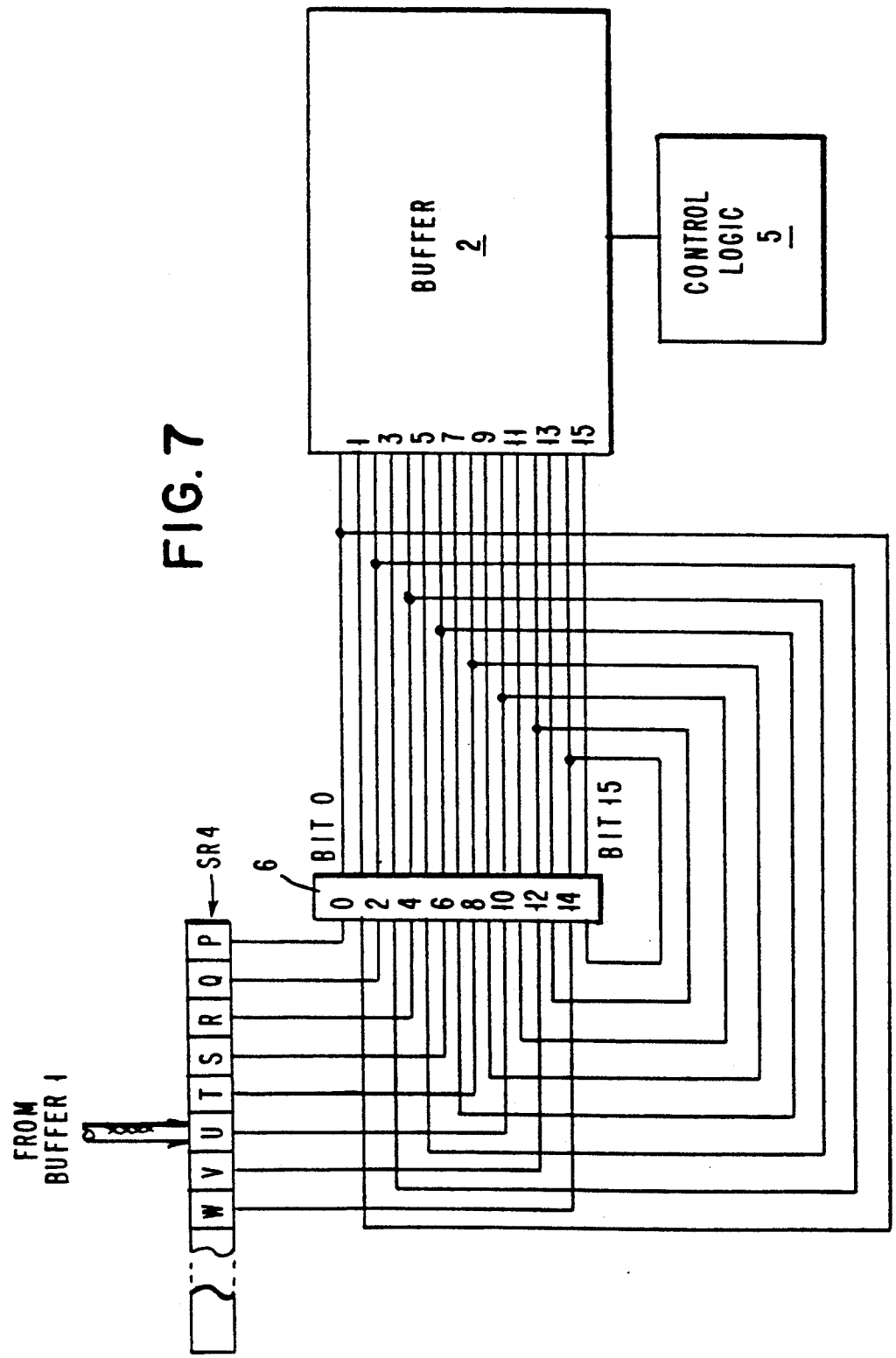

··· X1' X0' X7 X6 X5 X4 X3 X2 X1 X0 ···

··· Y1' Y0' Y7 Y6 Y5 Y4 Y3 Y2 Y1 Y0 ···

··· Z1' Z0' | Z7 Z6 Z5 Z4 Z3 Z2 Z1 Z0 | ··· CURRENT LINE

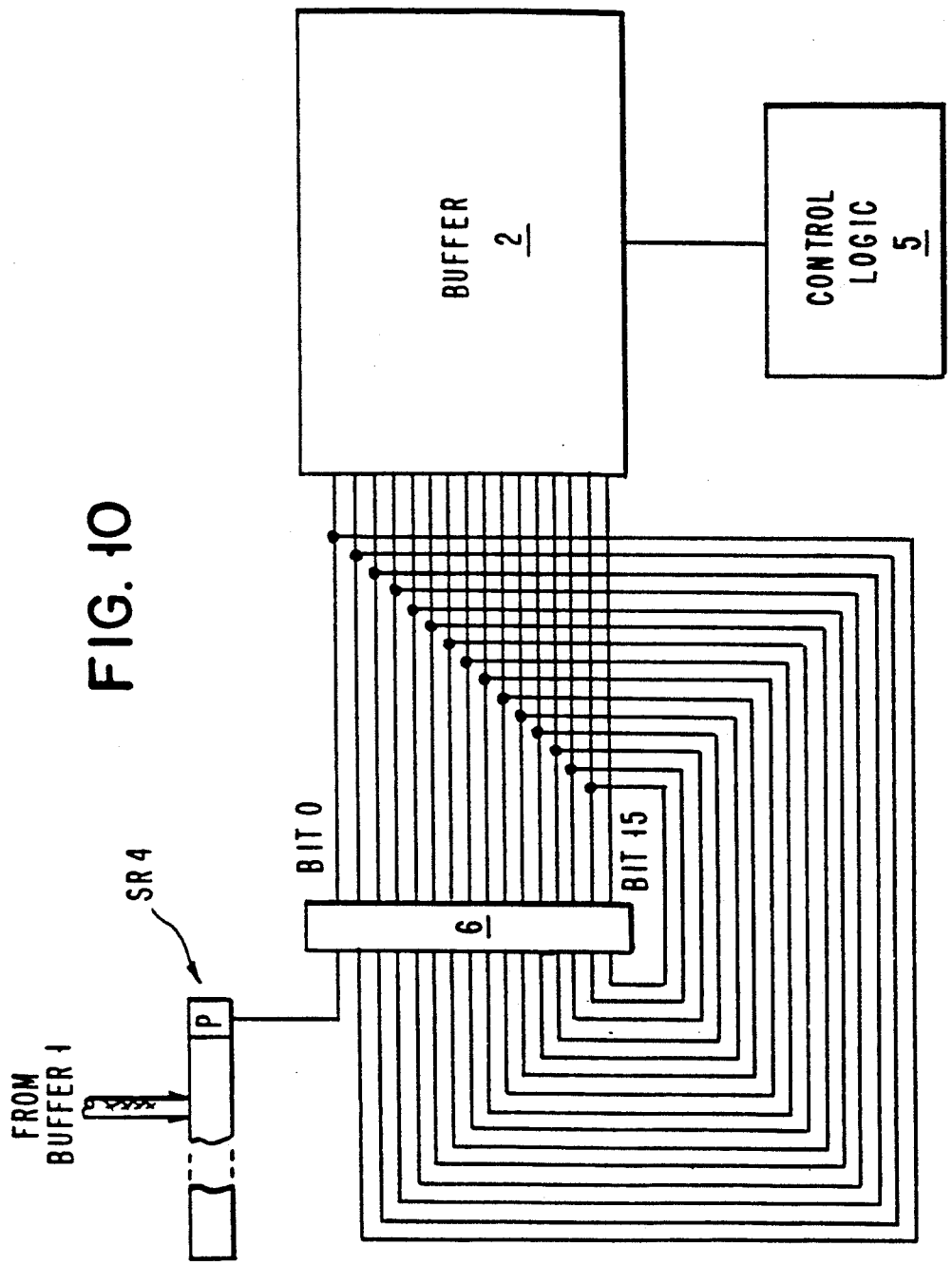

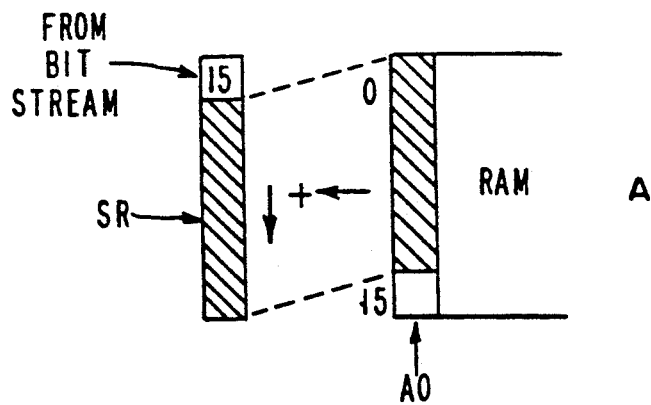
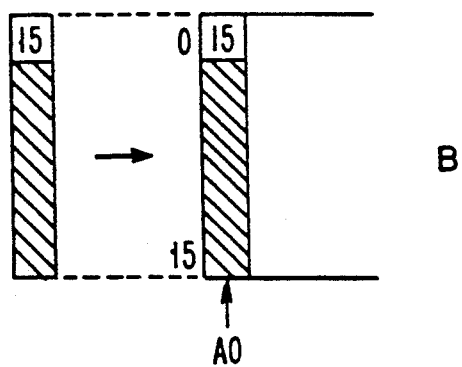
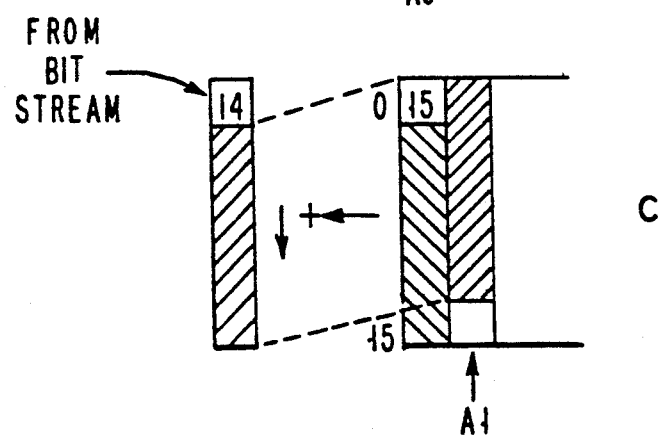
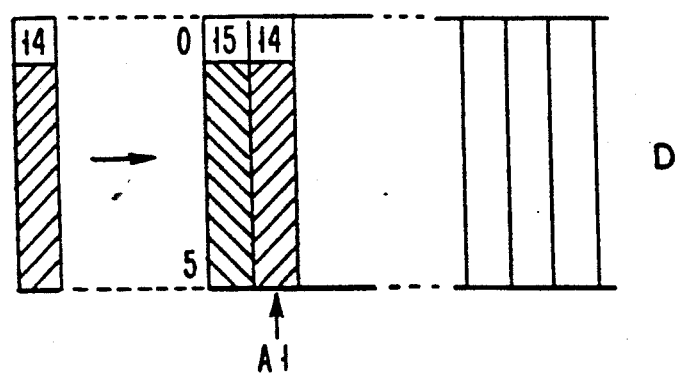
FIG. 16
PRIOR ART

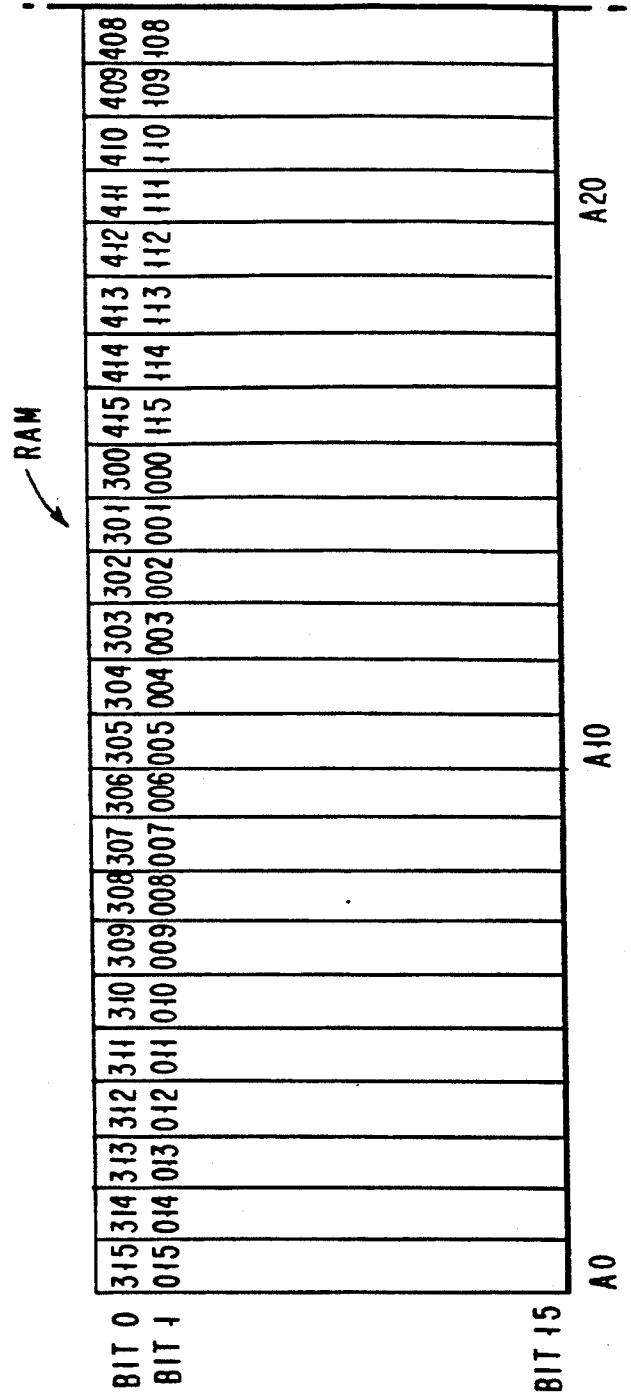
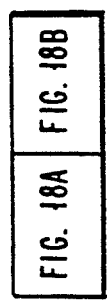
FIG. 18A
FIG. 18

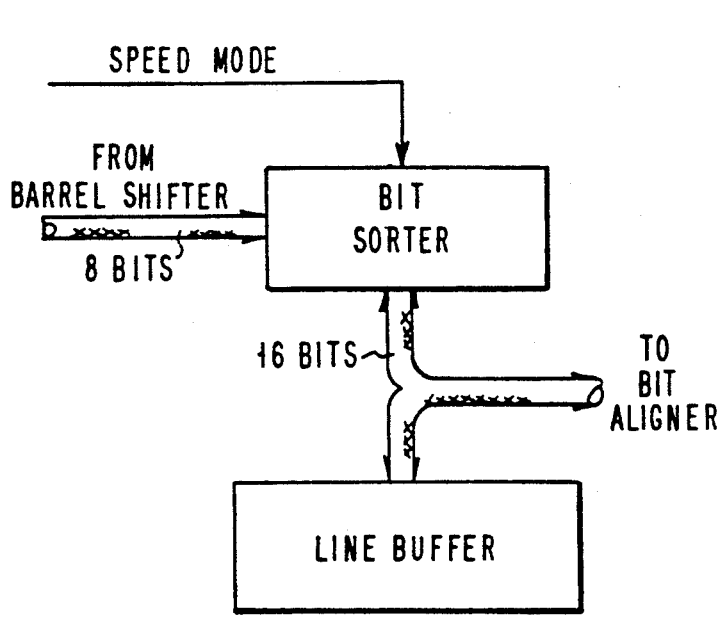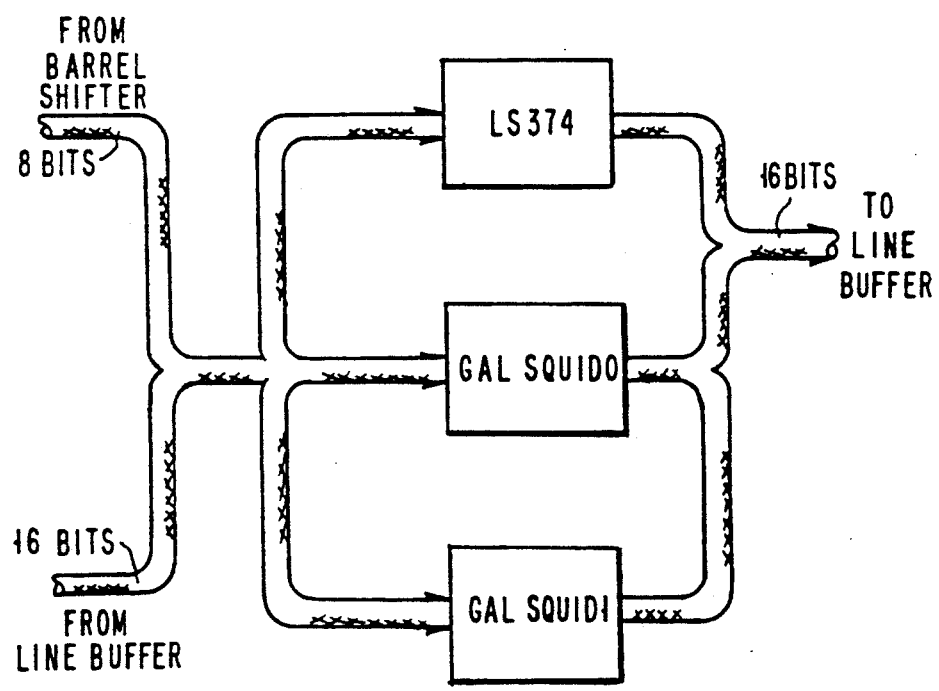
FIG. 23

IMAGE PROCESSING USING A RAM AND REPEAT READ-MODIFY-WRITE OPERATION

BACKGROUND OF THE INVENTION

A. Field of the Invention

This invention relates to image processing systems and more particularly to a system and method for use in such fields as character recognition, the inspection of printed circuit boards, and the image processing of visual robots.

B. Prior Art and Problems to be Solved by the Invention

To perform pattern recognition, it is usually necessary to set a 3×3 or 4×4 mask on the original image information and execute image information processing. Executing this masking process with a microprocessor is very inefficient, and requires much time because the amount of image information is enormous. Many attempts have been made to increase the efficiency of the masking process by adding hardware, but in no case has a sufficient processing speed been implemented using a comparatively small amount of hardware that can be economically produced. The art has been faced with a dilemma in that when a faster processing speed has been sought, the hardware becomes too large for production, and if the hardware is simply arranged, the processing speed becomes unacceptably slow.

To mask images represented by information that is densely packed in a storage unit in the form of consecutive bits, it is necessary to convert the items of image information in the storage unit to a form representing an original rectangular shaped image that has a length and a width. To accomplish this, the information needs to be re-packed in a storage unit with a length corresponding to the width of the original image. Such a storage unit, which may hold several lines of the image information, is called a line buffer. Line buffers have accordingly been provided with a function for storing image representations of several lines, making it possible to cut the image into rectangles of, for example, 3×3, for the masking process. Consequently, various hardware utilities for the masking process have been conceived, and it can be said that the difference in their construction resides in the method of constructing the line buffers. Among these methods are the shift register method and the RAM method. The shift register method representative of the conventional hardware utility operates generally as follows.

Shift register method

This method involves a long shift register of 2N+2 bits which is used as a line buffer for storing the N bits of the width of an image. Such a buffer will hold the information for two image lines and have 2 blank bits for separations. The image information read from the image buffer is first subjected to a parallel-serial conversion to form a bit stream of 1-bit data, which is then sent to this line buffer. For the parallel-serial conversion of the image data, a 16-bit shift register is used. This shift register can be loaded with 16 bits in parallel, and it functions to repeat loadings and shiftings, which consist of first performing parallel loading, then 15 bit shiftings, and again parallel loading, then 15 bit shiftings, and again parallel loading, 15 bit shiftings and so on, thereby producing a bit stream of 1-bit data. The bit stream created in this way is sent to the line buffer embodied by the shift register with 2N+2 bit locations. The circuit for converting the image data to a bit stream of 1-bit data is hereinafter referred to as a bit stream generator.

For mask processing, windows are opened at two appropriate bit locations counted from the beginning of the line buffer to allow bits from each of the two lines already stored to be fetched. These two bits and the one bit that is the last output of the bit stream generator, three bits in total, form a group of three bits arranged vertically in the original image. If these three bits are placed in three-bit shift registers, along with their successive bits in the line buffer, a 3×3 matrix can be obtained. The circuit for fetching and processing a 3×3 matrix is hereinafter referred to as a mask processing circuit.

The mask processing circuit performs the mask processing of a 3×3 bit pattern to output a one-bit result. The bits processed in this way are subjected to a serial-parallel conversion by a 16-bit serial-in parallel-out shift register to be converted to parallel data of 16 bits. Each time 16-bit data are accumulated in the shift register, they are written into a result buffer, whereby the images whose mask processing has been completed are accumulated in a result buffer. The method using a shift register is thus theoretically clear and provides for high-speed processing.

The disadvantages of the shift register method are that the hardware size tends to become large because a long shift register is required, and a variable-length shift register is difficult to implement in a circuit to permit the length of the shift register to be varied in order to accommodate units of image information with different widths.

Alternatively, the RAM scheme is conceivably a replacement for the shift register method and will now be described.

RAM method

In this method, a random access memory (RAM) is used instead of the shift register to perform equivalent work, thus avoiding the problem of the hardware size tending to become large as when the shift register method is used. Apart from its inconvenient operation, the use of a RAM can greatly increase the degree of integration. This makes it possible to obtain a virtual shift register of any length by varying the width of the address to be scanned so that an image of any length can be served. Therefore, a circuit that selects the tap position according to the width of an image as in the shift register method becomes completely unnecessary, and the hardware size can be significantly reduced for the same reason. Since the RAM does not have a function that can freely switch between shift and load, the help of an external circuit is required so that it can equivalently perform parallel-load/serial-out to make it function as a shift register.

In the RAM method, as in the shift register scheme, the image data received in an image buffer is first converted into a bit stream of 1-bit data by a bit stream generator. Then, each bit of this bit stream is written into a RAM. The procedure for writing the bits into the RAM will now be described with reference to the drawings.

FIG. 15 shows an example of a raw image on the screen of a personal computer. Three words are arranged horizontally on the screen, with 48 words in all arranged vertically in 16 lines. Each word is assigned an address, as shown in FIG. 15. The left-most bit of each word is the most significant bit (MSB) and the rightmost bit is the least significant bit (LSB).

The procedure for writing the word (16 bits) positioned at ADDRESS 0 on the screen into the RAM will be described with reference to FIG. 16. The RAM has 16 bits (vertically arranged in the Figure from the BIT 0 position to the BIT 15 position), and its addresses are identified as A0, A1, etc. The unit SR in the figure represents a shift register.

Firstly, using the Read-Modify-Write (RMW) operation of the RAM, the contents of address A0 of the RAM are read into the SR, and then the SR is shifted to the right (downwardly in the Figure) discarding the LSB. Bit 015 of the bit stream is inserted into the empty MSB location of the SR (15 in FIG. 16A) and the contents of the SR are written into A0. As a result, bit 015 of the raw image is written into the RAM in the BIT 0 position and the other bits originally in address A0 have been shifted by one location with the last bit (LSB) discarded (FIG. 16B). Next, after the address pointer has been shifted to address A1, the contents of A1 are read into the SR. The SR is shifted to the right, and bit 014 from the bit stream is inserted into the empty MSB location (14 in FIG. 16C). Subsequently, the contents of the SR are written into address A1. As a result, bit 014 is written into the RAM in the BIT 0 position with the other bits being shifted accordingly in address A1 (FIG. 16D). FIG. 17 shows the result after this operation has been repeated until the address pointer points to RAM address A23. The 16 bits of ADDRESS 0 from the screen, along with 7 bits of ADDRESS 1, have been written into the BIT 0 line of the RAM. It will accordingly be seen how one word of image data is stored in the RAM while dispersed over 16 addresses. After the address pointer has been incremented to A47, thus writing in three screen words (ADDRESSES 0, 1, and 2) on the BIT 0 line, the address pointer again points to address A0. A similar operation is repeated for the next three screen words (ADDRESSES 3, 4, and 5) with the bits in the BIT 0 line being shifted to the BIT 1 line in their respective addresses as the new bits are entered into the addresses A0, A1, etc., in the BIT 0 position. FIG. 18 shows the state of the RAM when the address pointer is pointing to address A26 in the second scan. It will be seen that the screen ADDRESS 0 bits in the RAM BIT 0 line in FIG. 17 have been shifted into the BIT 1 line as the next set of address bits (screen ADDRESS 3) from the bit stream is entered in the BIT 0 line. Similarly, screen ADDRESS 4 bits will replace ADDRESS 1 bits in the BIT 0 line and ADDRESS 5 bits will replace ADDRESS 2 bits. Thus, the 16-bit RAM functions as a 16-line buffer for storing the 48 image words in ADDRESSES 0 through 47 from the screen of FIG. 15.

It will be seen from a comparison of FIGS. 15 and 18 that the raw image may be looked upon as being rotated by 90 degrees in the RAM by viewing the image ADDRESS 0 bits as being arranged beside the ADDRESS 3 bits in the RAM rather than above them as on the screen.

In the above example, 48 addresses of the RAM were used, since the image width was 48 bits. If the image width were 96 bits, it would only be necessary to use 48 additional addresses of the RAM. Using the RAM in this manner provides a great advantage, because any image width can be readily accommodated. On the other hand, in order to process one bit, two accesses are required by the RMW (Read-Modify-Write) operation of the RAM. Further, since the access time of the RAM is far slower than the delay time of a logical IC, there will be the drawback that the processing speed is not increased.

As noted above, this technique of forming a line buffer utilizing a RAM can be regarded as rotating the image information. In terms of the example, if attention is paid to the contents of the line buffer, into which 16 lines of image information are packed, it will be seen that 16 longitudinal bits from line 1 through line 16 of the image information are packed in each address of the RAM (e.g., one bit (15) from ADDRESS 0 through ADDRESS 45 of the raw image data is contained in address A0 of the buffer), so that the image has been rotated by 90 degrees. More specific descriptions of methods in which a RAM is used as the line buffer and the image is rotated by 90 degrees may be found in:

1. Japanese Published Unexamined Patent Application No. 58-159184 and
2. Japanese Published Unexamined Patent Application No. 63-85983.

However, the methods described in these official publications both use an 8×8 rotator to rotate an 8×8 block of the image data by 90 degrees at one time. Accordingly, this presents the problem of the necessary hardware becoming too large.

SUMMARY OF THE INVENTION

An objective of this invention is to provide an image processing system, adaptable to improving the speed of pattern recognition applications, that can serve any image width, has a minimum of additional hardware, and includes a line buffer that allows high-speed processing.

Accordingly, to make it possible to accommodate any image width, the line buffer is preferably constructed using a RAM, and to keep the hardware to a minimum, it is preferable to fill the RAM with image data while repeating the RMW (Read-Modify-Write) operation. However, as noted above, with this approach, a problem is presented by the processing speed. This problem is solved herein by devising an improved method for packing data into the RAM. More particularly, in accordance with the invention, the data packing of the line buffer (RAM) is performed on a multiple-bit basis rather than a bit-by-bit basis to increase the processing speed, that is, the number of bits written into the line buffer by one RMW operation is increased, for example, to 2, 4, or 8, so that the processing speed increases accordingly. These three operating modes, wherein the numbers of bits written by one RMW operation are 2, 4 and 8, will be referred to herein as the double-speed, four-times-speed and eight-times-speed modes, respectively. A mask processing system is provided for processing the data so packed in the line buffer.

BRIEF DESCRIPTION OF THE DRAWINGS

FIG. 7 is a circuit diagram for implementing one method of the eight-times-speed mode of the invention.

FIG. 10 is a circuit diagram for implementing one method of the normal speed mode in accordance with the invention.

FIGS. 16A-D illustrate the operation of the normal speed mode.

FIG. 23 illustrates a bit sorter circuit.

DETAILED DESCRIPTION OF THE PREFERRED EMBODIMENT

Figure 1:
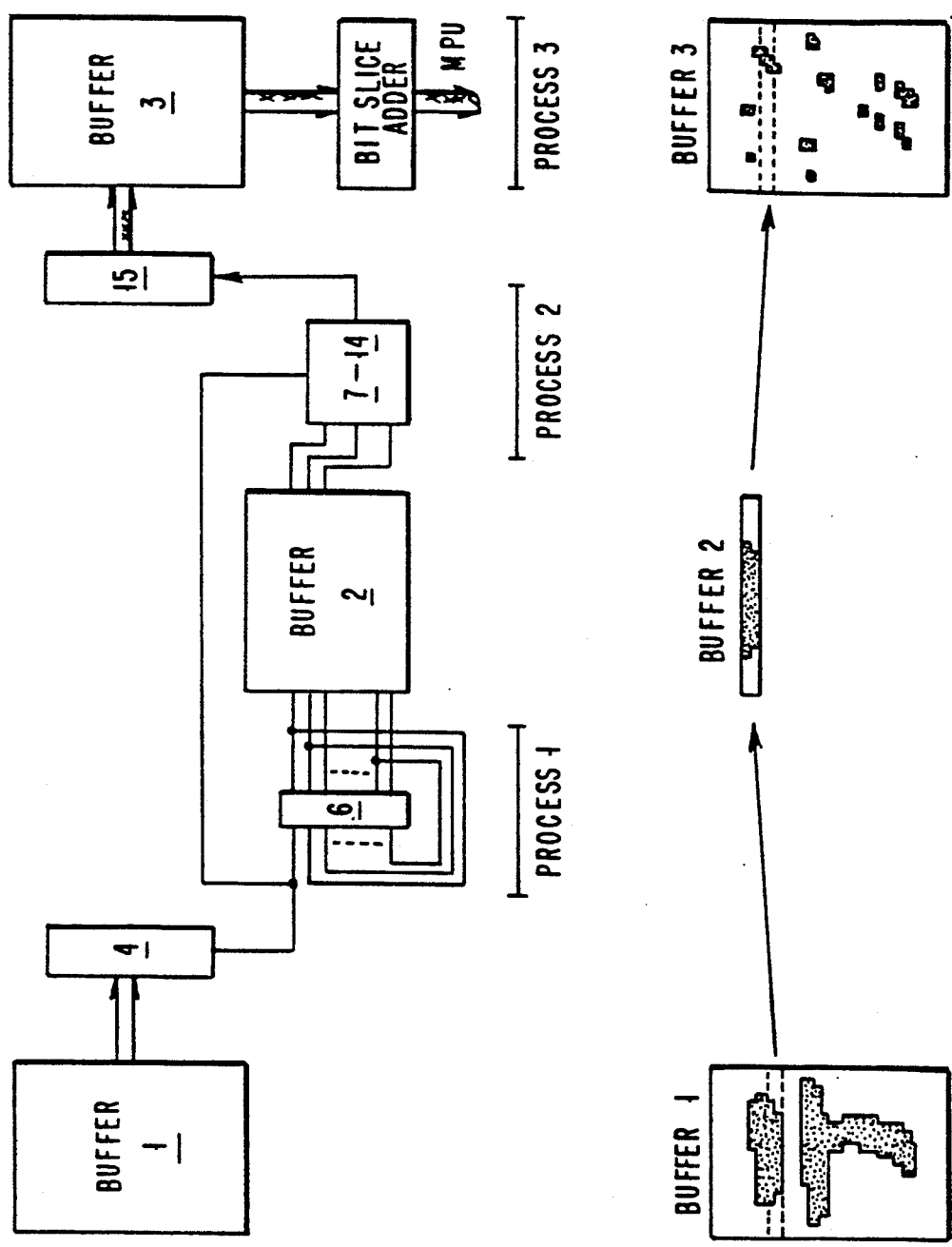
FIG. 1 is a block diagram illustrating an image processing system in accordance with the invention.

FIG. 1 shows an example of an image processing system in accordance with the present invention. The system of FIG. 1 generally comprises six elements, namely, three data buffers (1, 2, and 3) and three processes. The buffers and processes are alternately arranged in the following sequence:

1. Buffer 1: Raw data
2. Process 1: 90-degree rotation of data
3. Buffer 2: Line buffer
4. Process 2: Mask processing
5. Buffer 3: Result buffer
6. Process 3: Computation of black bits, etc.

Each element will now be described in detail.

1. Buffer 1

This buffer, as illustrated in the lower portion of FIG. 1, contains unprocessed image data. Since this buffer is dedicated while the image processor is operating, it is preferably an independent memory separated from the system memory of the microprocessor. In terms of circuitry, it is possible to assign Buffer 1 within the system memory by means of a DMA, but the system performance would be substantially sacrificed. Consequently, this buffer will usually share the same memory as Buffer 3, which will be described below. The size of Buffer 1 defines the maximum area that the image processor can handle at one time. Thus to represent a character image by a $64 \times 64$ dot image, a buffer holding at least 512 bytes is required.

2. Process 1

As seen generally in the upper portion of FIG. 1, the contents of Buffer 1 are read and fed, through a suitable shift register 4 and latch 6, to a line buffer labeled Buffer 2 (preferably a 16-bit RAM). Buffer 2 continuously executes the memory cycle of the Read-Modify-Write operation (RMW) on each address, which repetition of the memory operation achieves the transfer of the data in Buffer 1 into Buffer 2 and, when in the normal mode, rotated by 90 degrees in the manner indicated above. However, such rotation will not occur in the multiple-speed mode of the invention. The operation of this process in accordance with the present invention will now be described in detail.

Figure 2:
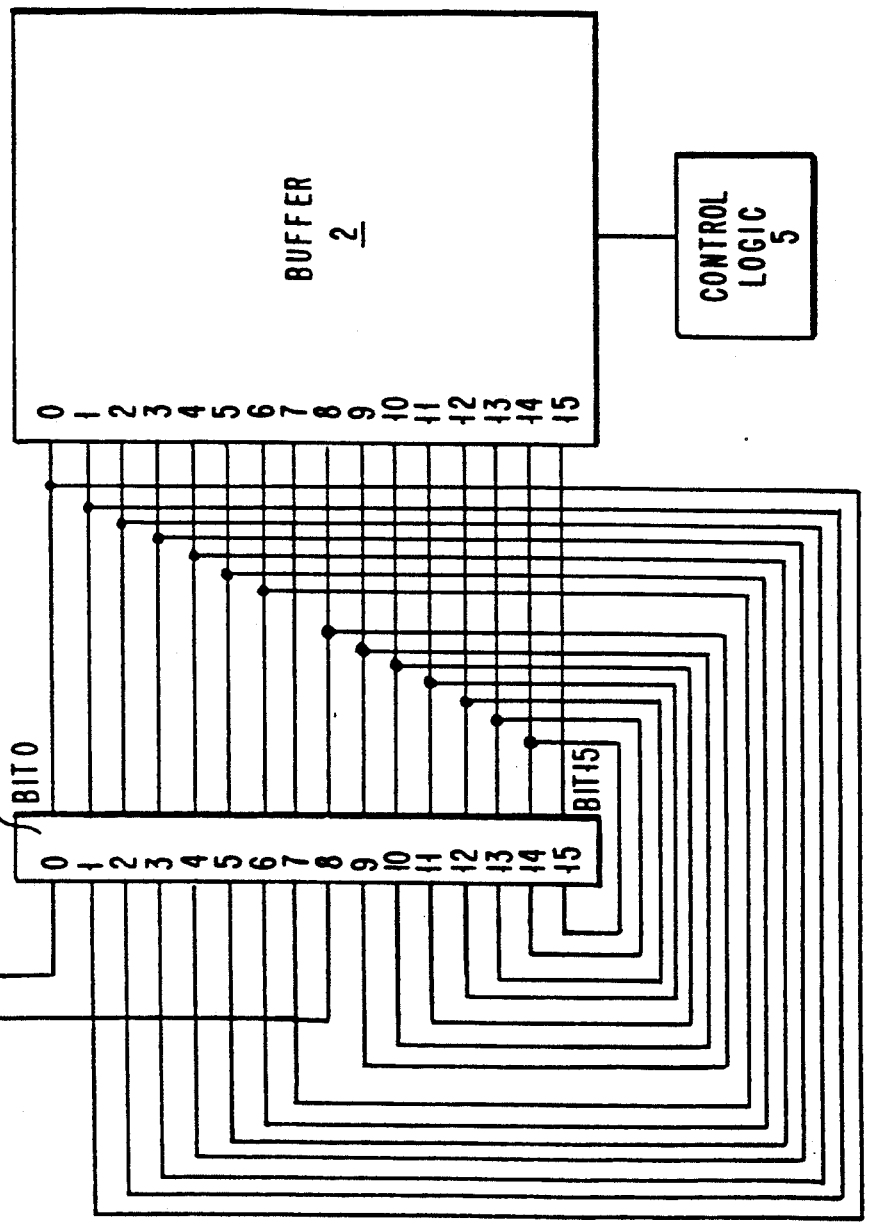
FIG. 2 is a circuit diagram for implementing one method of the double-speed mode of the invention.

Firstly, FIG. 2 shows a hardware configuration for implementing the double-speed mode. SR 4 is a shift register, such as 4 in FIG. 1, which is concurrently loaded with 16 bits from Buffer 1 in parallel, and thereafter repeats seven times an operation of shifting to the right by two bits at a time. The most significant bit (MSB) from Buffer 1 enters the register's right-most position, and the least significant bit (LSB) enters the left-most position. There is a 16-bit latch, latch 6, between register SR 4 and Buffer 2. The output bits 0, 1, ..., 15 of latch 6 are respectively input to the bit positions 0, 1, ..., 15 of Buffer 2. The MSB and its adjacent bit, in bit positions P and Q of register SR 4, are respectively input to the bits 0 and 8 of latch 6. Concurrently, during the READ operation, bits 0-6 of Buffer 2 are respectively input to bits 1-7 of latch 6 while bits 8-14 are respectively input to bits 9-15 of latch 6. Control logic 5 controls this operation.

Figure 3:
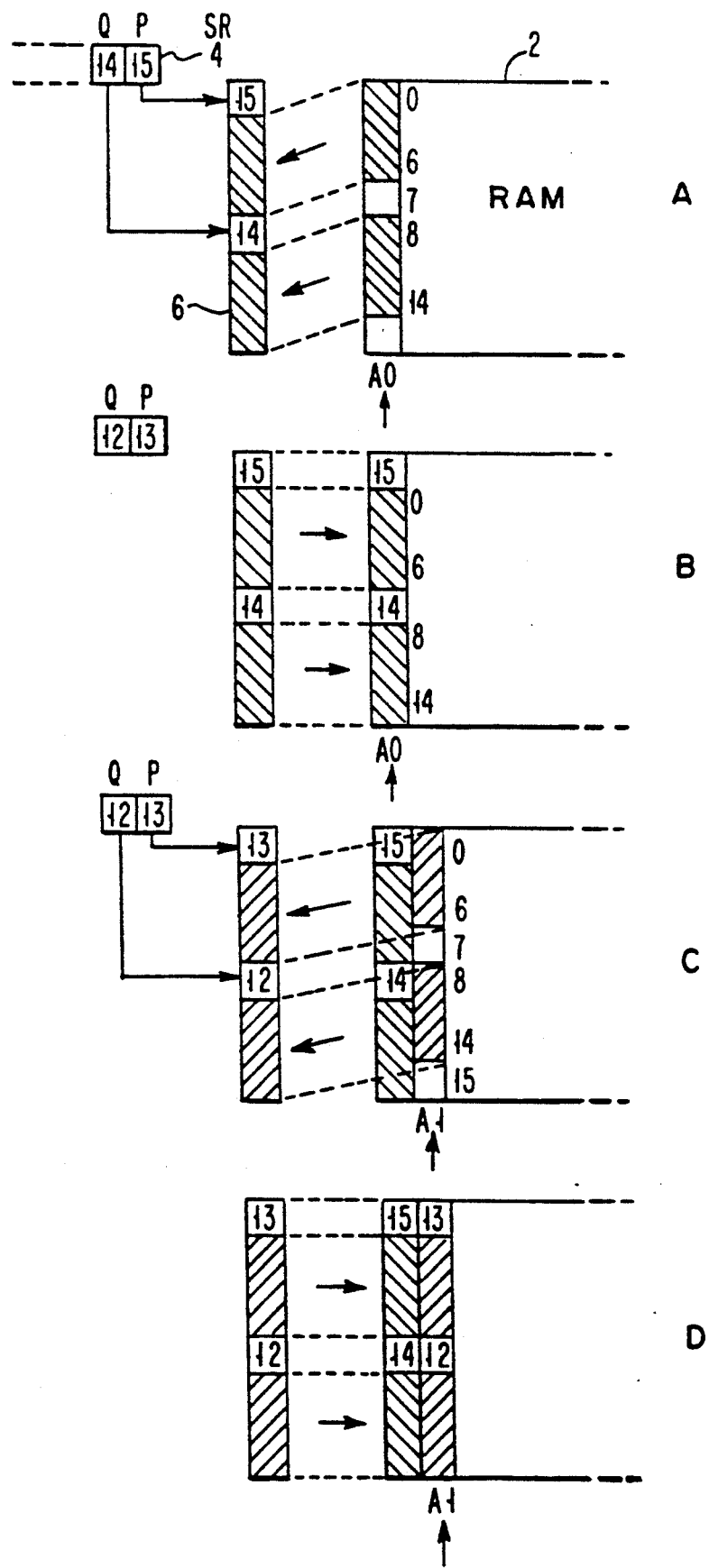
FIGS. 3A-D illustrate the operation of the double-speed mode.
Figure 4:
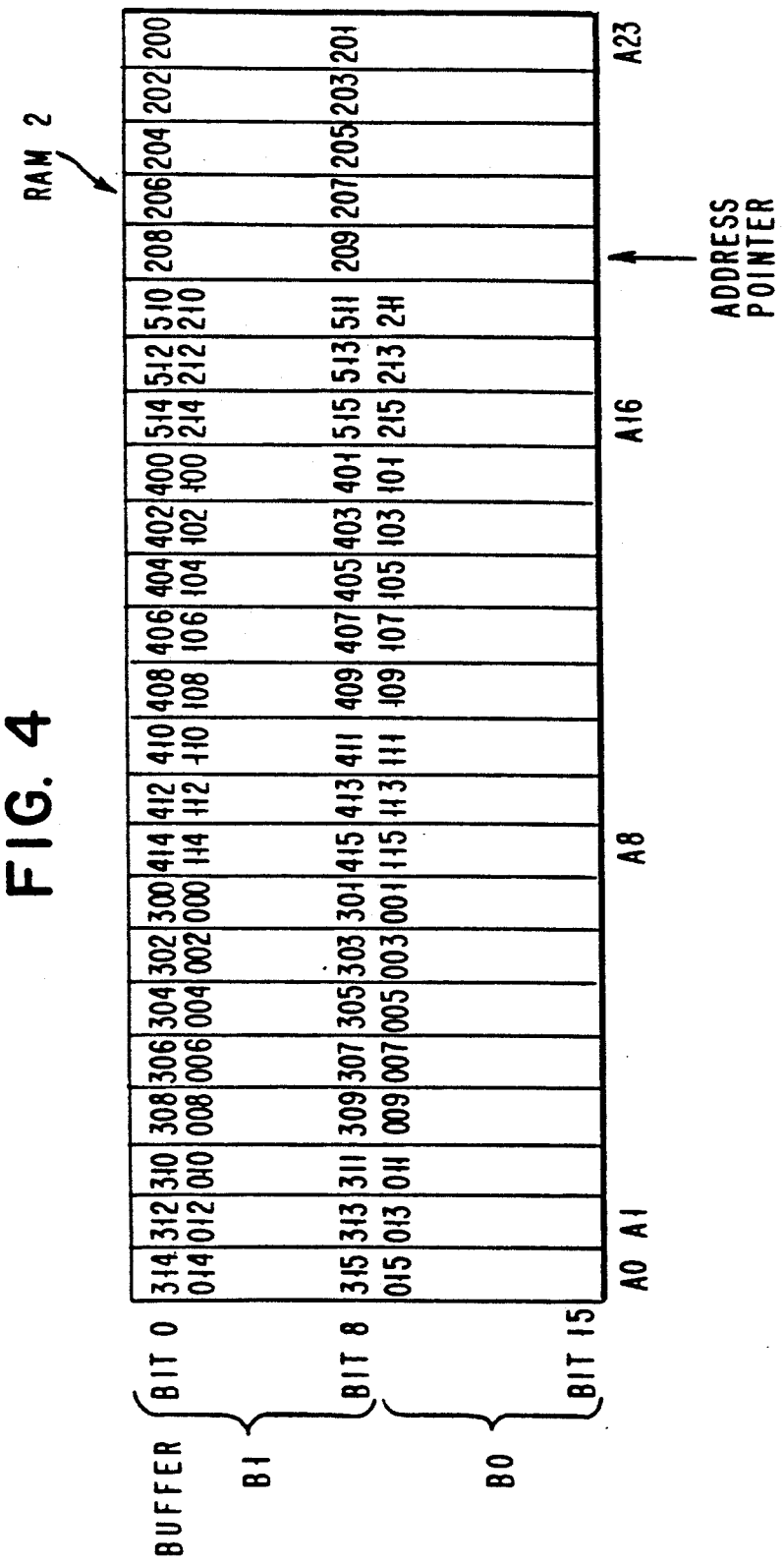
FIG. 4 illustrates the way in which data are packed into the line buffer in the double-speed mode.
Figure 15:
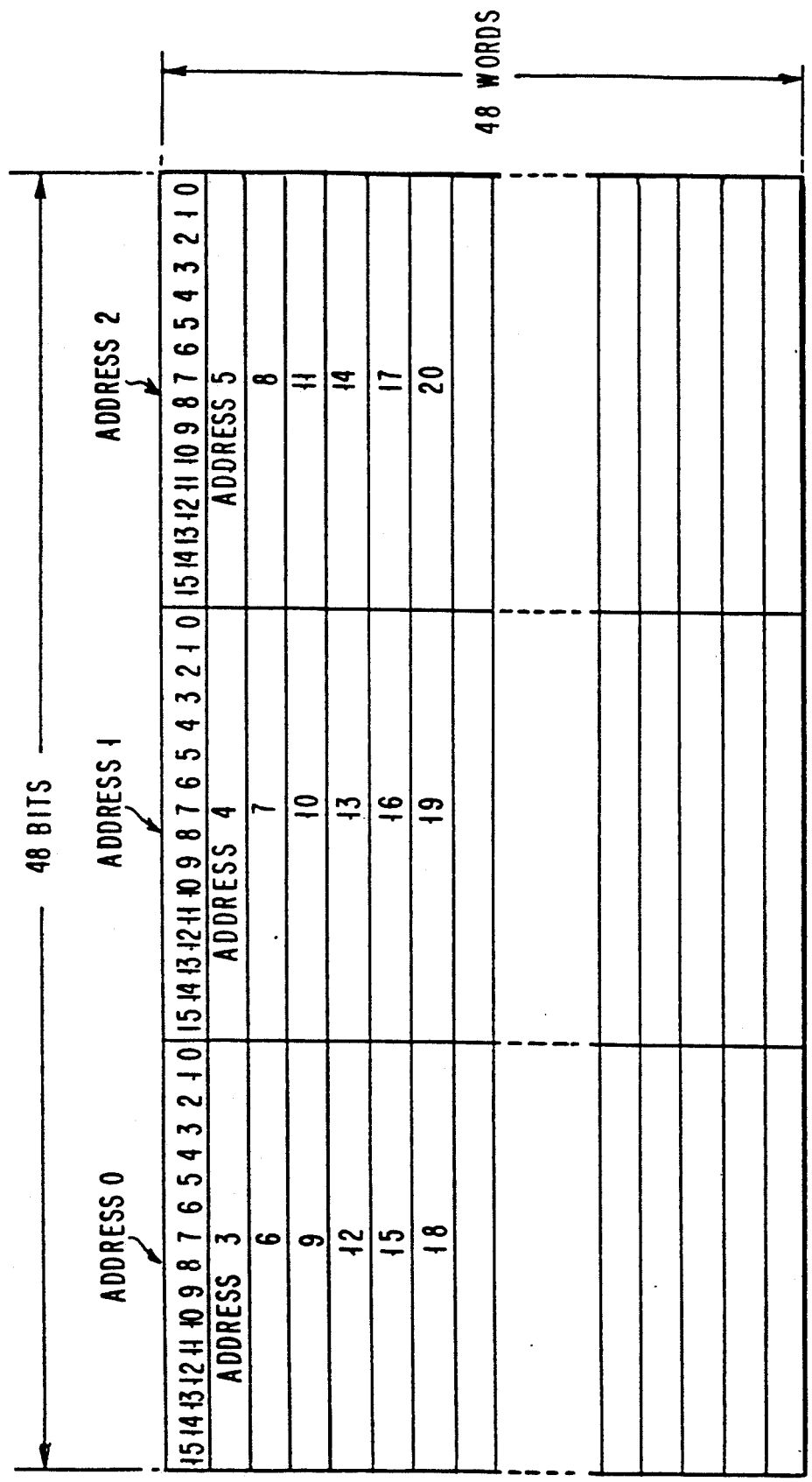
FIG. 15 illustrates raw image data on the screen of a personal computer.
Figure 17:
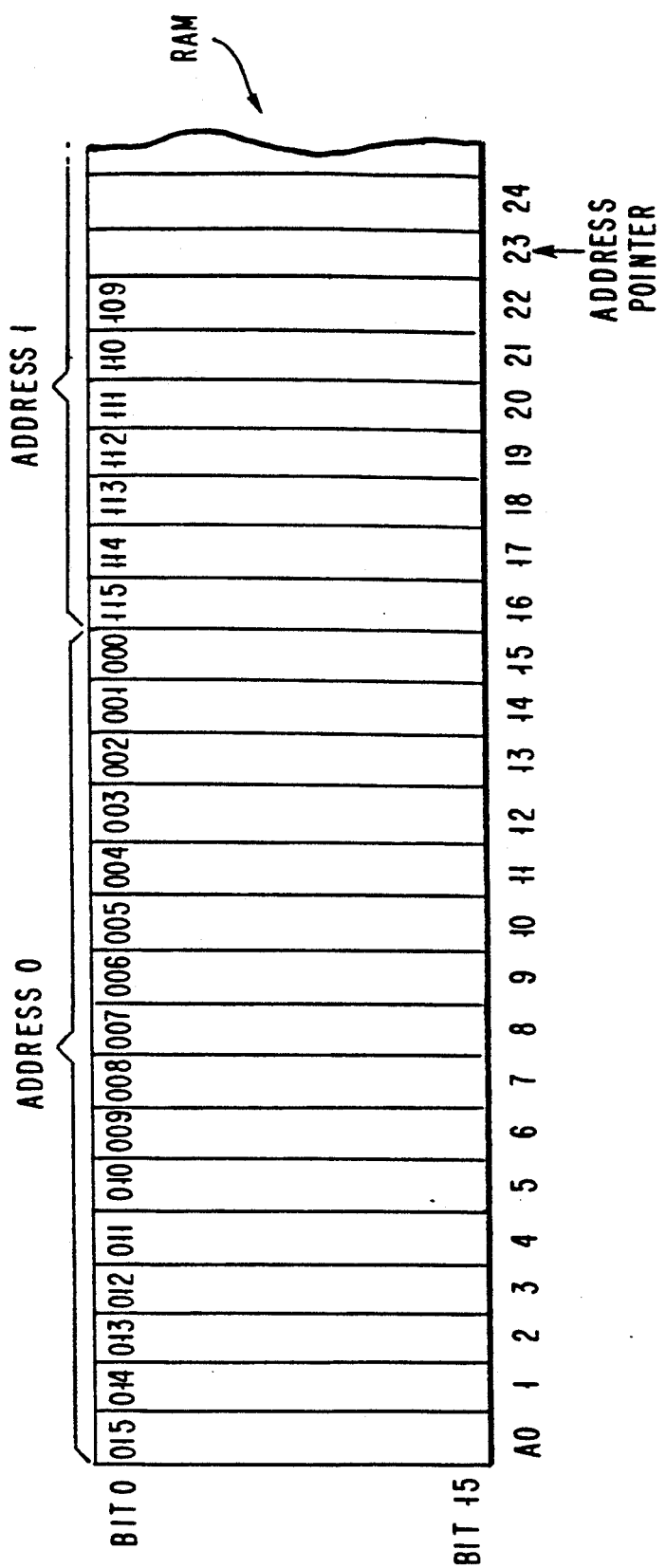
FIGS. 17 and 18 illustrate the way in which data are packed into the line buffer in the normal speed mode.
Figure 18B:
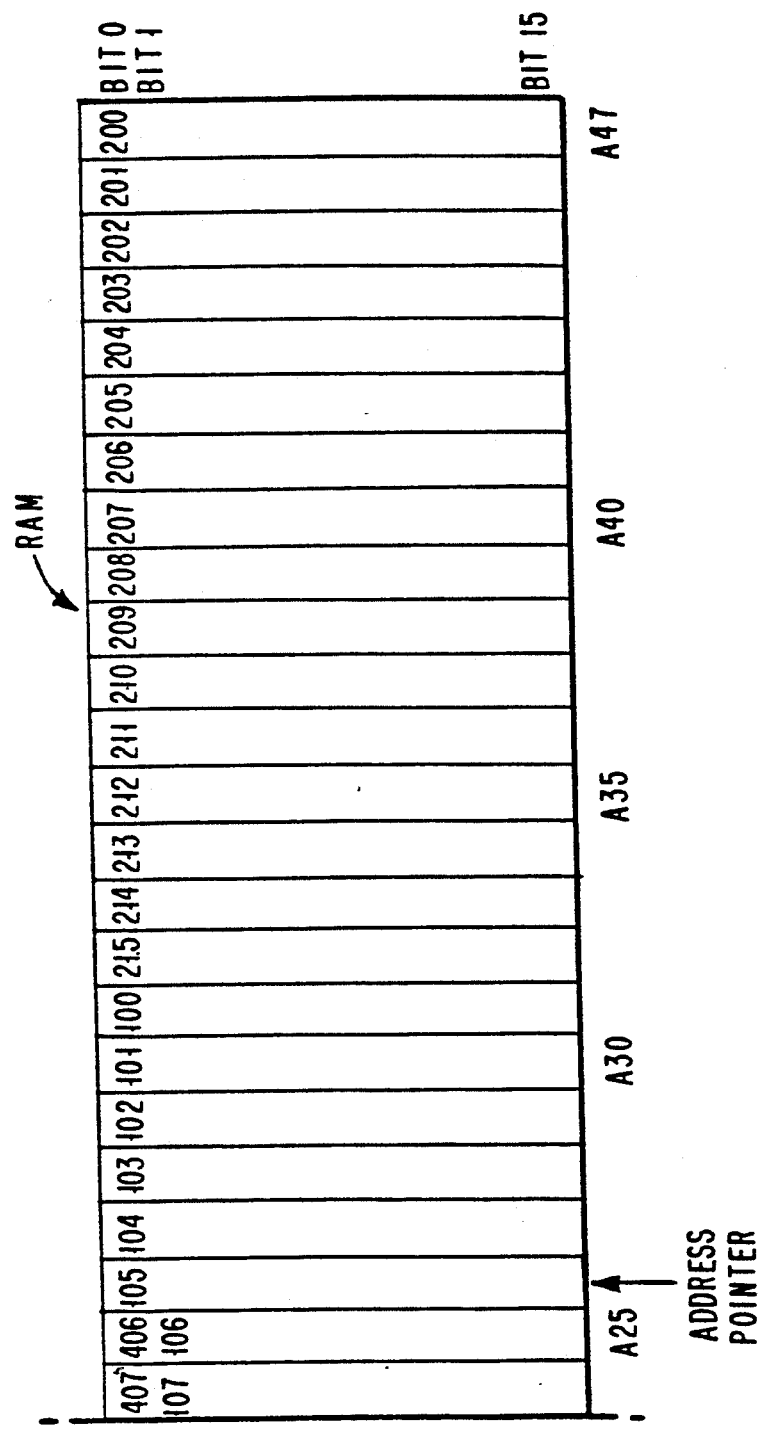

Referring to FIG. 3, a description will now be provided of the way in which one word of image bits, 0-15, is packed into Buffer 2 (RAM 2). Firstly, image bits 15 and 14 are contained in positions P and Q of register SR 4. In this state, RMW is executed on address A0 of Buffer 2, that is, bits 0-6 and 8-14 of address A0 are input to bits 1-7 and 9-15 of latch 6, respectively. Bits 7 and 15 of address A0 are discarded. Bits P and Q, or bits 15 and 14, in SR 4 are fetched and input to bits 0 and 8 of latch 6, respectively (FIG. 3A). Then, the contents of latch 6 are written into address A0. In parallel with this writing, the contents of register SR 4 are shifted to the right by 2 bits. In other words, the contents of bit positions P and Q become image bits 13 and 12 (FIG. 3B). At this stage, RMW is executed on address A1 of Buffer 2 (FIGS. 3C and D). By repetition of this operation, the image data shown in FIG. 15 are stored in Buffer 2 (RAM 2) in the manner indicated in FIG. 4, that is, the odd bits are packed into bits 15-8 of the large buffer or RAM 2 (forming a small buffer B0), while the even bits are packed into bits 7-0 of RAM 2 (forming another small buffer B1). By using 24 addresses of RAM 2, an image width of 48 bits can be handled. The number of image lines processed during each such operation will be eight, half that of the normal speed mode.

Figure 5:
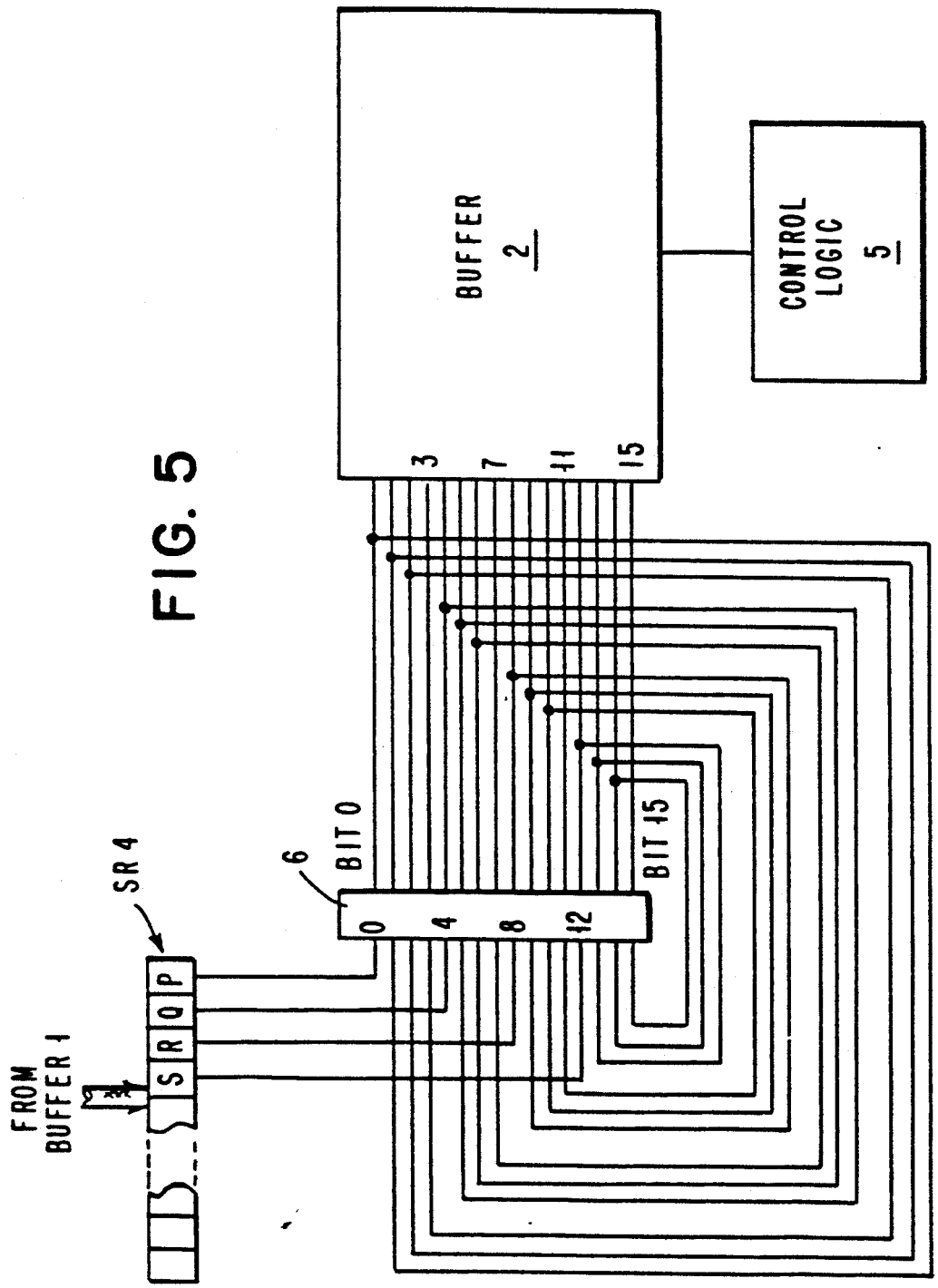
FIG. 5 is a circuit diagram for implementing one method of the four-times-speed mode of the invention.

A hardware configuration for implementing the four-times-speed mode is shown in FIG. 5. It is different from the double-speed mode apparatus of FIG. 2 in the following respects:

The upper four bits of register SR 4, P, Q, R, and S are fetched and input to bits 0, 4, 8, and 12 of latch 6, respectively.

When the contents of Buffer 2 are read out into latch 6, bits 3, 7, 11, and 15 are discarded.

Register SR 4 performs either the operation of shifting to the right by four bits or the operation of loading 16 bits from Buffer 1 in parallel each time RMW is executed on Buffer 2.

Figure 6:
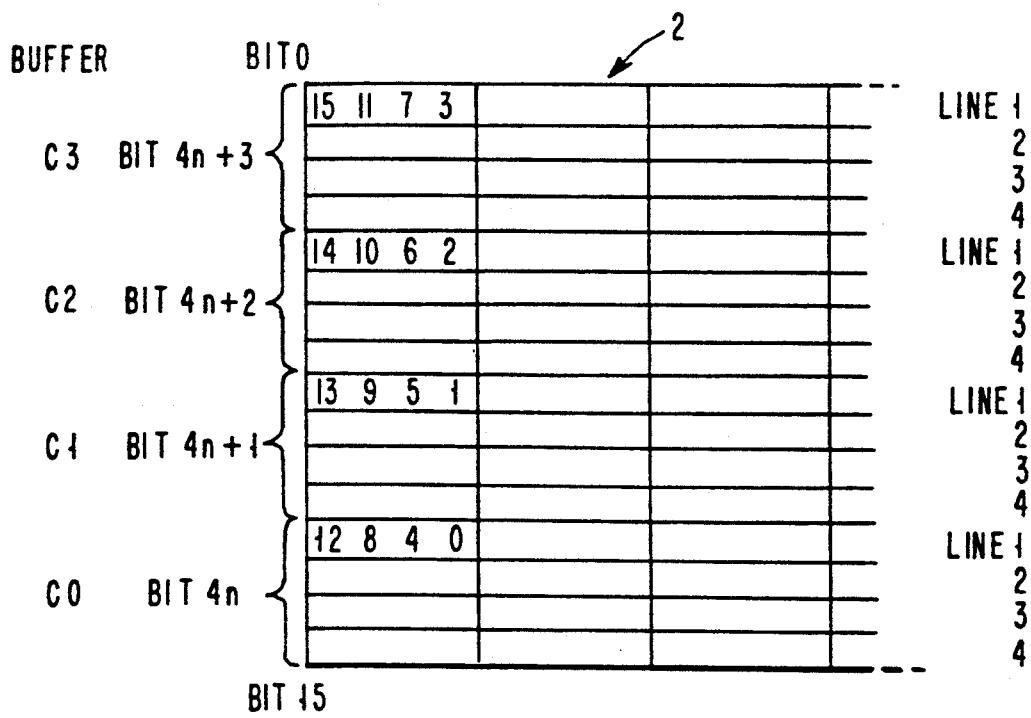
FIG. 6 illustrates the way in which data are packed into the line buffer in the four-times-speed mode.

FIG. 6 shows the result obtained by repeating an operation similar to that of FIG. 3 on the apparatus of FIG. 5 to store 16 bits of image data in Buffer 2. If the image width is 48 bits, a line buffer for four lines is formed by using 12 addresses. That is, four sets of bits 4n, 4n+1, 4n+2 and 4n+3 are respectively packed into bit locations 15-12 (small buffer C0), 11-8 (small buffer C1), 7-4 (small buffer C2) and 3-0 (small buffer C3) of larger buffer or RAM 2. It will be seen that with the four-times-speed mode the RAM 2 has been divided into 4 small buffers formed by logically dividing the bit width of said RAM means into 4 portions.

FIG. 7 shows a hardware configuration for implementing the eight-times-speed mode. It is different from the systems of FIGS. 2 and 5 in the following respects:

The upper eight bits of register SR 4, P, Q, R, S, T, U, V, and W are input to bits 0, 2, 4, 6, 8, 10, 12, and 14 of latch 6, respectively.

When the contents of Buffer 2 are read out into latch 6, bits 1, 3, 5, 7, 9, 11, 13, and 15 are discarded.

Register SR 4 performs either the operation of shifting to the right by eight bits or the operation of loading 16 bits from Buffer 1 in parallel each time RMW is executed on Buffer 2.

Figure 8:
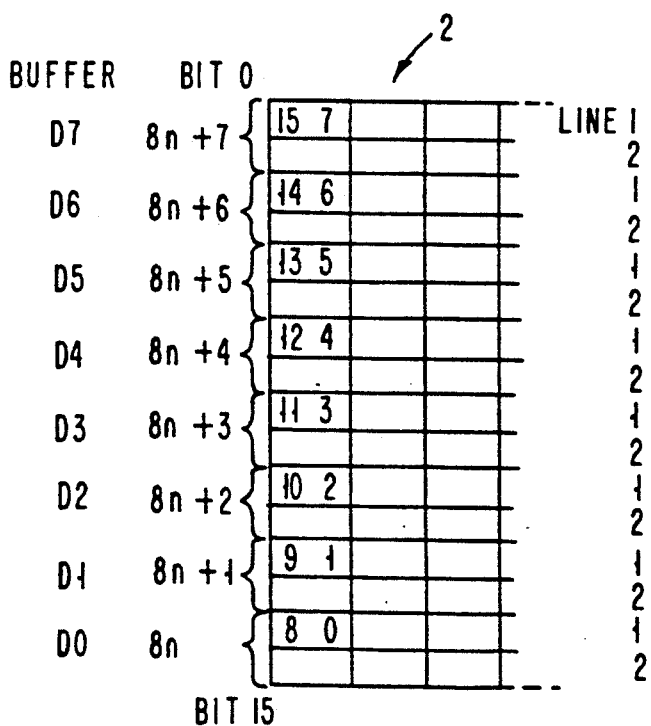
FIG. 8 illustrates the way in which data are packed into the line buffer in the eight-times-speed mode.

FIG. 8 shows the result obtained by repeating an operation similar to that of FIG. 3 on the apparatus of FIG. 7 to store 16 bits of image data in Buffer 2. If the image width is 48 bits, a line buffer for two lines is formed by using six addresses, that is, eight sets of bits 8n, 8n+1, 8n+2, 8n+3, 8n+4, 8n+5, 8n+6 and 8n+7 are respectively packed in the bit locations 15-14 (small buffer D0), 13-12 (small buffer D1), 11-10 (small buffer D2), 9-8 (small buffer D3), 7-6 (small buffer D4), 5-4 (small buffer D5), 3-2 (small buffer D6), and 1-0 (small buffer D7) of larger buffer or RAM 2. Of course, if a 32-bit RAM is used as Buffer 2, a line buffer for four lines is formed in the eight-times-speed mode. It will here be seen that RAM 2 has been divided into 8 small buffers formed by logically dividing the bit width of said RAM means into 8 portions. Accordingly, in practicing the invention, if n is the number of bits fetched from the image data shift register at a time, the bit width of the RAM will be divided into n portions forming n small buffers therein, the lengths of which, X, will be determined by dividing the image bit width, N, by n. That is, the number of addresses X used in the RAM will be N/n.

Figures 9, 12:
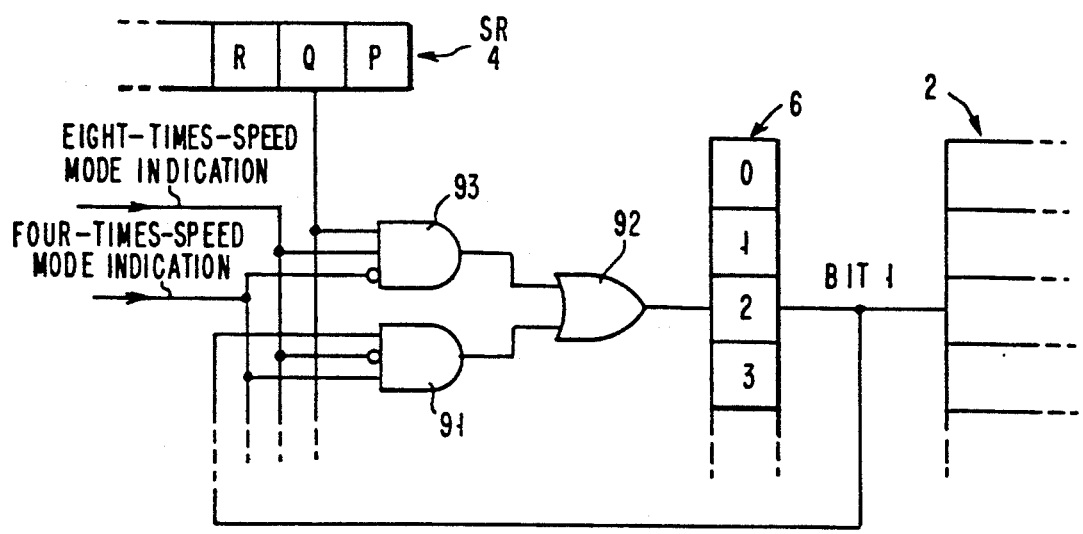
FIG. 9 is a circuit diagram for switching the four-times-speed mode and the eight-times-speed mode.
FIG. 12 illustrates the positional relationship of image data to be processed.

For the sake of convenience in explanation, the apparatuses for the double-speed, four-times-speed and eight-times-speed modes have been described with reference to different figures. However, these functions may be served by one apparatus. FIG. 9 shows the parts of an exemplary apparatus used for both the four-times-speed and eight-times-speed modes. With the hardware configuration of FIG. 9, in the four-times-speed mode, during the READ operation bit 1 of Buffer 2 is supplied to bit 2 of latch 6 through AND gate 91 and OR gate 92, while in the eight-times-speed mode, bit Q of the register SR 4 is supplied to bit 2 of latch 6 through AND gate 93 and OR gate 92. Similarly, the operation of writing one bit into a RAM for one RMW (the so-called normal speed mode) and the eight-times-speed mode may be switched in one apparatus. For illustration, the hardware configuration implemented for the normal speed mode is shown in FIG. 10.

Register SR 4 exists between Buffers 1 and 2 and adjusts the number of bits sent to Buffer 2 at one time. Accordingly, if Buffer 1 is an 8-bit RAM and the number of bits read out at one time is eight, and if Buffer 2 is dedicated to the eight-times-speed mode, then register SR 4 is unnecessary. If Buffer 1 is a 16-bit RAM, register SR 4 repeats the following operations when Buffer 2 is operated in the double-speed, four-times-speed, and eight-times-speed modes.

Double-speed mode: One load and seven shifts of 2 bits.

Four-times-speed mode: One load and three shifts of 4 bits.

Eight-times-speed mode: One load and one shift of 8 bits.

A separate shift register may be used for each mode, or the same one may be used by switching its operation. A register performing different operations according to the mode is called a barrel shifter. Its actual implementation is described later in this specification. A circuit that changes the writing of bits into the line buffer in response to the change of the output of the barrel shifter according to the mode is called a bit sorter circuit. This is obtained by generalizing the circuit of FIG. 9. Details are given later in this specification.

Figure 11:
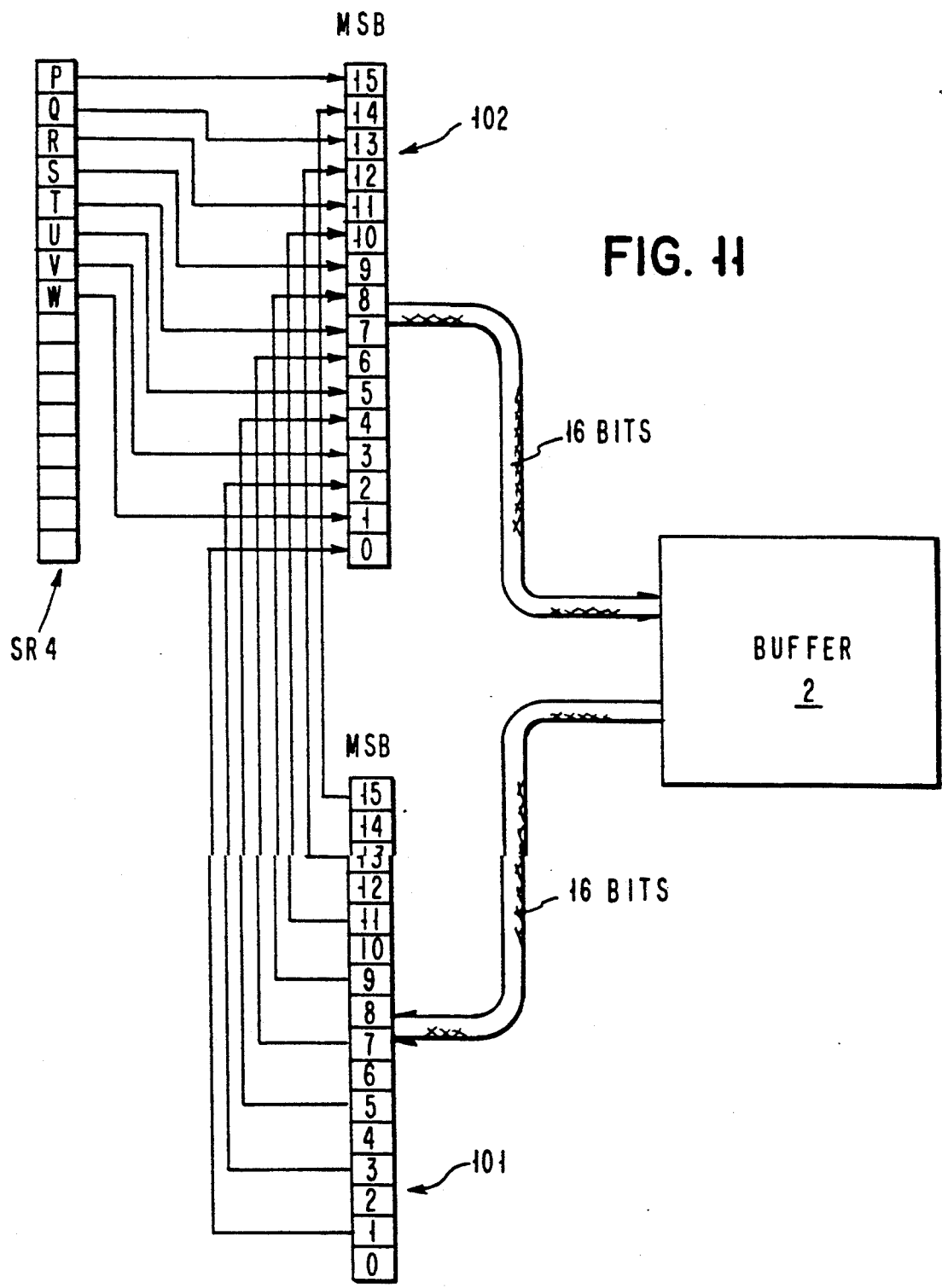
FIG. 11 is a circuit diagram showing another method of implementing the eight-times-speed mode.

Although one latch, latch 6, was used for the RMW in the apparatuses of FIGS. 2, 5, and 7, its function may be divided into two registers. FIG. 11 shows such a variation for the eight-times-speed mode. In this example, the contents read out from a certain address of the buffer, RAM 2, are read directly into read-in register 101. In transferring from read-in register 101 to write-in register 102, half of the contents of register 101 are discarded and the remaining bits are also shifted in position. Bits from positions P-W of register SR 4 are inserted into the remaining positions of register 102. The contents of write-in register 102 formed in this way are written into the original address of RAM 2.

3. Buffer 2

As will be seen from the foregoing description, this is a line buffer using a RAM. An advantage of using a memory as a line buffer is that a line buffer of any width is easily obtained. A disadvantage is that the easy way of using it can cause a system bottleneck, because the access time of a memory is much longer than the delay time of a gate. However, in the present image processing system, a bottleneck is avoided by setting the system to the double-speed mode. If RMW is executed on a state-of-the-art SRAM, one operation takes about 200 nsec.

4. Process 2

In this process, a mask processing such as 2×2, 3×3, or 4×4 is carried out. For instance, a 3×3 smoothing mask chamfers the corners of a black image. That is, if a 3×3 mask is applied to a 3×3 image and there is a 2×2 black image, the central black is chamfered.

Since, in the normal mode, the image is reproduced in Buffer 2 merely rotated by 90 degrees, the processing for cutting out a 3×3 image is relatively easy. In the double-speed mode, however, even if the original image is one line, it is separately written into several bit positions, or smaller buffers, within Buffer 2. Therefore, a special device is required for mask processing. Here, the 3×3 mask processings in the eight-times-speed mode and four-times-speed mode in accordance with the invention will be described.

Figure 13:
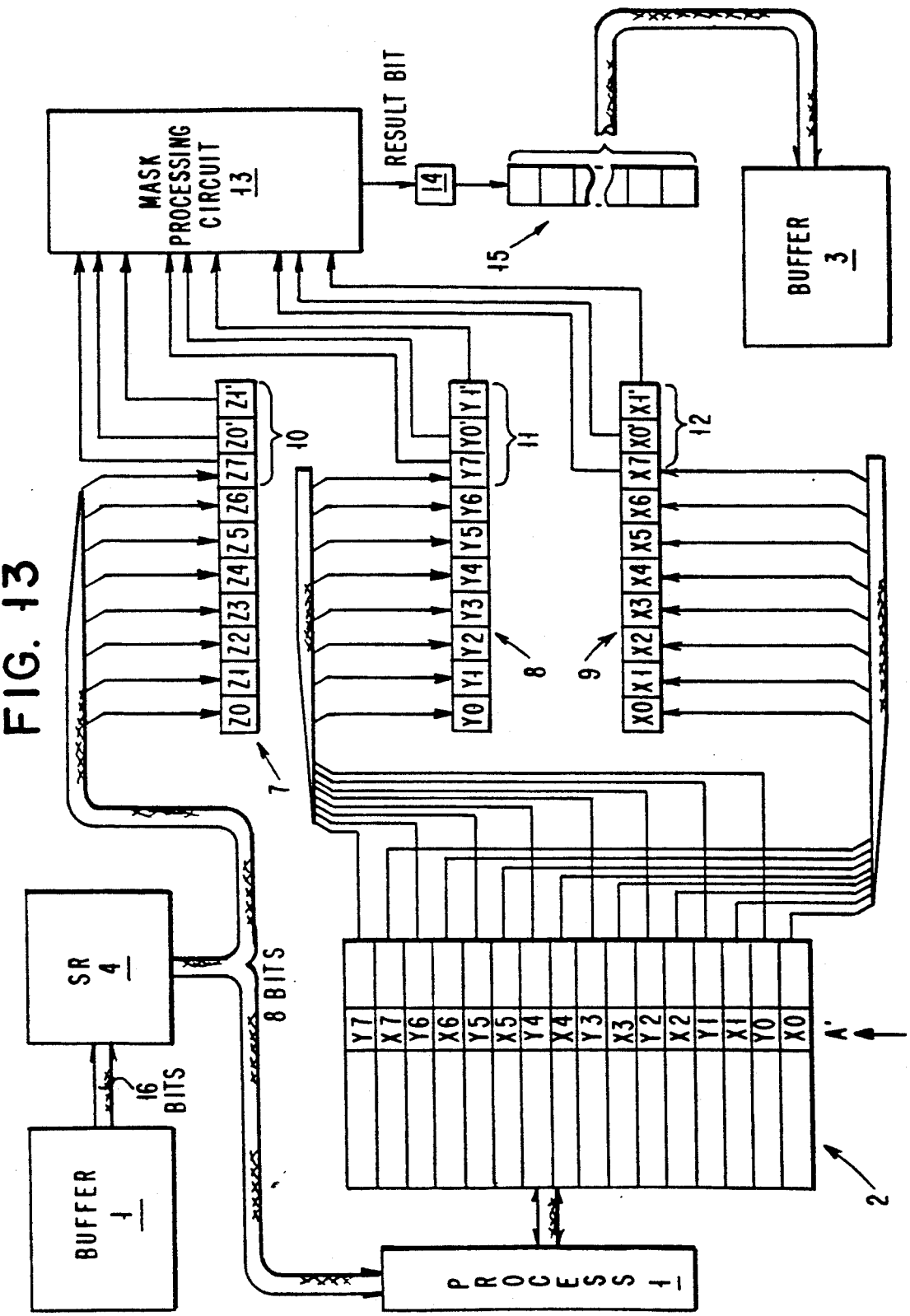
FIG. 13 is a circuit diagram showing one method of implementing $3 \times 3$ mask processing for the eight-times-speed mode.

FIG. 12 shows the image data bits to be processed and FIG. 13 illustrates the data processing carried out when eight of those bits, Z0-Z7, are received in the line buffer in the eight-times-speed mode. As seen in FIG. 13, shift registers 7, 8, and 9 are 10-bit shift registers, and their leading eight bits can be loaded in parallel. For instance, eight bits sent from register SR 4 are loaded in parallel in register 7. In register 8, bits from positions 0, 2, 4, 6, 8, 10, 12, and 14 of RAM 2 are loaded in parallel. In register 9, bits from positions 1, 3, 5, 7, 9, 11, 13, and 15 of RAM 2 are loaded in parallel. Shift registers 7, 8, and 9 perform one data loading followed by seven bit shiftings, while one RMW operation (two accesses) is executed on RAM 2. It will be seen that the respective three tail bits of shift registers 7, 8, and 9 (which include the right-most bit of the new load and the two left-most bits of the previous load) also act as the 3-bit shift registers 10, 11, and 12 of mask processing circuit 13. Briefly, mask processing circuit 13 refers to the contents of the 3-bit registers 10, 11, and 12 to perform the mask processing, and outputs a result bit 14. The result bit 14 is provided to an 8-bit shift register 15. When eight result bits are accumulated in shift register 15, they are loaded in parallel into Buffer 3. Eventually, the 8-bit result data are generated and loaded into Buffer 3 while one RMW (two accesses) is executed on RAM 2. The output of Buffer 3 is input to a Bit Slice Adder and from there to the microprocessing unit MPU (see FIG. 1).

A more specific description will now be given. When bits Z0-Z7 (FIG. 12) are passed from register SR 4 in Process 1 to be received in the line buffer (RAM 2), they are loaded into the leading eight bits of register 7 at the same time. Simultaneously, the data two lines and one line before Z0-Z7, namely, X0-X7 and Y0-Y7, are stored in the address A' pointed to by the address pointer of RAM 2. When the contents of address A' are read out, the leading eight bits of register 8 are loaded with Y0-Y7, while the leading eight bits of register 9 are loaded with X0-X7, with the right-most two bits remaining from the last load. Thus, the image data of FIG. 12 is reproduced in the three registers 7, 8, and 9. After that, 3×3 mask processings are sequentially performed while shifting the contents of registers 10, 11, and 12. In this way, one access of the image information (SR 4), one access of the line buffer (RAM 2), and one access of result Buffer 3 are enabled to proceed concurrently and, consequently, the processing speed of an image processing system using a RAM as a line buffer is increased greatly.

Figure 14:
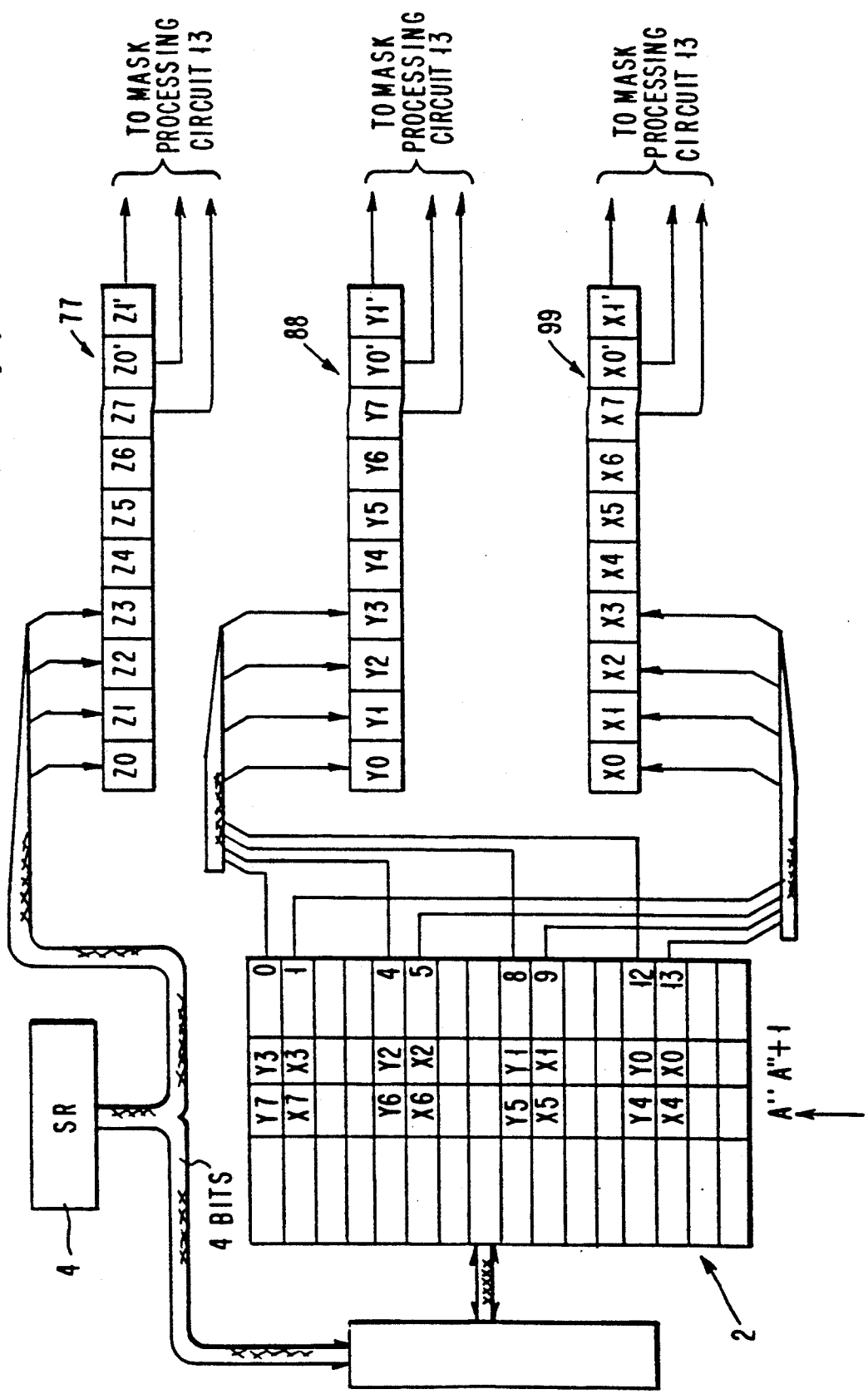
FIG. 14 is a circuit diagram showing one method of implementing $3 \times 3$ mask processing for the four-times-speed mode.

FIG. 14 shows a circuit for the four-times-speed mode obtained by modification of the circuit in FIG. 13. Shift registers 77, 88, and 99 are similar to registers 7, 8, and 9, except that the leading four bits can be loaded in parallel. Four bits from the register SR 4 are input to the leading four bits of register 77. Bits 0, 4, 8, and 12 of RAM 2 are input to the leading four bits of register 88. Bits 1, 5, 9, and 13 of RAM 2 are input to the leading four bits of register 99. For the four-times-speed mode, bits Z7-Z4 of FIG. 12 are written into RAM 2 by one RMW, and bits Z3-Z0 are written into RAM 2 by the next RMW. Designating the address in which bits Z7-Z4 are written as A", bits X7-X4 and Y7-Y4 are also loaded there, as shown in FIG. 14. In addition, bits X3-X0 and Y3-Y0 are loaded in address A"+1. Accordingly, as a result of the reading-out of the contents of addresses A" and A"+1 during the two RMWs, bit strings Z0-Z1', Y0-Y1', and X0-X1' are formed in registers 77, 88, and 99. The subsequent mask processing is the same as in the example in FIG. 13.

Incidentally, it is also possible to allow the same register to act as registers 7 and 77. In such a case, it is necessary to provide a gate circuit for switching the eight-times-speed mode and the four-times-speed mode, as shown in FIG. 9. The design of such a circuit will be easily within the purview of those skilled in the art. Similarly, one mask-processing apparatus may be adapted to both the normal speed mode and the eight-times-speed mode. An image processing system in which the normal speed mode and the eight-times-speed mode can be switched is useful, since it can perform both image rotation processing and mask processing at high speed. A general-purpose circuit that changes the way the data is read from the line buffer and the way the data is read from the barrel shifter in dependence on the switching of the modes is referred to as a bit aligner circuit. Details are given later in this specification.

5. Buffer 3

This buffer, which is the result buffer, shares the same memory as Buffer 1, and Buffers 1 and 3 are dynamically switched and used by switching the pointer. That is, if one wishes to perform further processing on the results of a certain processing, this can be initiated simply by switching the pointers for Buffers 1 and 3, rather than by transferring the contents of Buffer 3 to Buffer 1 and then restarting the image processor.

6. Process 3

This processes the data a little and returns the so processed data to the microprocessor when the contents of Buffer 3 are read out. Since Buffers 1 and 3 share the same memory in terms of circuitry, the same process is available to Buffer 1. There are four types of data processing:

(1) No process.

(2) Count the number of "1" bits and convert it to a binary number. This is used for counting the number of black bits or the number of patterns. The resultant data are the 5-bit binary numbers 0–15 for 16 bits.

(3) Replace the sequence of the LSB and the MSB. Replace bits 0–15 with bits 15–0. This process is used for reversing the image.

(4) Count the number of "1" bits after setting a mask. Set a 16-bit mask and count the number of "1" bits only for the places where the mask is "1." This process is used when one wishes to count "1" bits only in a certain area.

Barrel Shifter

Figure 19:
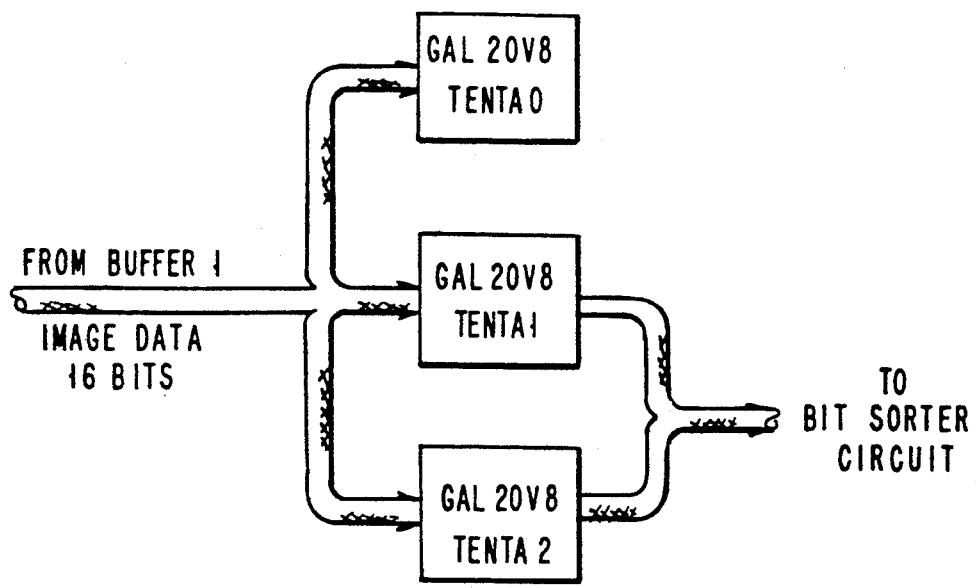
FIG. 19 illustrates a barrel shifter.

Turning now to the details of specific components, the barrel shifter will be described with reference to FIG. 19. It will be appreciated that if the number of bits processed simultaneously by the line buffer can be changed, various operations can be performed on the same hardware and, as a result, the operability will improve. Also, if the number of bits processed by the line buffer at a time becomes one, the image can be rotated. The barrel shifter exists between the storage device containing image information and the line buffer, and sends the number of bits corresponding to the operation mode of the line buffer (Process 1). The output of the barrel shifter changes as shown in Table 1 when the speed mode is changed.

TABLE 1

| | b15 | b14 | b13 | b12 | b11 | b10 | b09 | b08 | b07 | b06 | b05 | b04 | b03 | b02 | b01 | b00 |
|---|---|---|---|---|---|---|---|---|---|---|---|---|---|---|---|---|
| | | | | | | | | Input Data | | | | | | | | |
| B00 | — | — | — | — | — | — | — | 8 | — | — | — | 4 | — | 2 | — | 1 |
| B01 | — | — | — | — | — | — | 8 | — | — | — | 4 | — | 2 | 1 | | |
| B02 | — | — | — | — | — | 8 | — | — | — | 4 | — | 2 | 1 | | | |
| B03 | — | — | — | — | 8 | — | — | — | 4 | — | 2 | 1 | | | | |
| B04 | — | — | — | 8 | — | — | — | 4 | — | 2 | 1 | | | | | |
| B05 | — | — | 8 | — | — | — | 4 | — | 2 | 1 | | | | | | |
| B06 | — | 8 | — | — | — | 4 | — | 2 | 1 | | | | | | | |
| B07 | 8 | — | — | — | 4 | — | 2 | 1 | | | | | | | | |
| B08 | — | — | — | 4 | — | 2 | 1 | | | | | | | | | |
| B09 | — | — | 4 | — | 2 | 1 | | | | | | | | | | |
| B10 | — | 4 | — | 2 | 1 | | | | | | | | | | | |
| B11 | 4 | — | 2 | 1 | | | | | | | | | | | | |
| B12 | — | 2 | 1 | | | | | | | | | | | | | |
| B13 | 2 | 1 | | | | | | | | | | | | | | |
| B14 | 1 | | | | | | | | | | | | | | | |
| B15 | | | | | | | | | | | | | | | | |
| M00 | — | — | — | — | — | — | — | — | — | — | — | — | — | — | — | L |
| M01 | — | — | — | — | — | — | — | — | — | — | — | — | — | — | L | |
| M02 | — | — | — | — | — | — | — | — | — | — | — | — | — | L | | |
| M03 | — | — | — | — | — | — | — | — | — | — | — | — | L | | | |
| M04 | — | — | — | — | — | — | — | — | — | — | — | L | | | | |
| M05 | — | — | — | — | — | — | — | — | — | — | L | | | | | |
| M06 | — | — | — | — | — | — | — | — | — | L | | | | | | |
| M07 | — | — | — | — | — | — | — | — | L | | | | | | | |
| M08 | — | — | — | — | — | — | — | L | | | | | | | | |
| M09 | — | — | — | — | — | — | L | | | | | | | | | |
| M10 | — | — | — | — | — | L | | | | | | | | | | |
| M11 | — | — | — | — | L | | | | | | | | | | | |
| M12 | — | — | — | L | | | | | | | | | | | | |
| M13 | — | — | L | | | | | | | | | | | | | |
| M14 | — | L | | | | | | | | | | | | | | |
| M15 | L | | | | | | | | | | | | | | | |

In Table 1 the Bxx values represent the output of the latch, and the bxx values represent the input of the latch. First, the image data are loaded into the barrel shifter in parallel, and then the shift operation is performed. The inputs of the barrel shifter latches are switched in accordance with this table. The lower half of the table shows the image data (Mxx) entering each latch during the loading operation. The upper half of the table shows the operation of the barrel shifter. For example, b15, or the latch input for B15, is connected to the output of B14 in the normal speed mode. It is switched to B13 in the double-speed mode, B11 in the four-times-speed mode and B07 in the eight-times-speed mode, thereby constituting 1-, 2-, 4-, and 8-bit barrel shifters. The barrel shifter consists of three GAL (Generic Array Logic) modules (a type of programmable logic device) and feed the number of bits to a bit sorter circuit, according to the speed mode. For the internal logic of the GAL, reference may be had to the contents of TENTA 0, TENTA 1, and TENTA 2.

Figure 20:
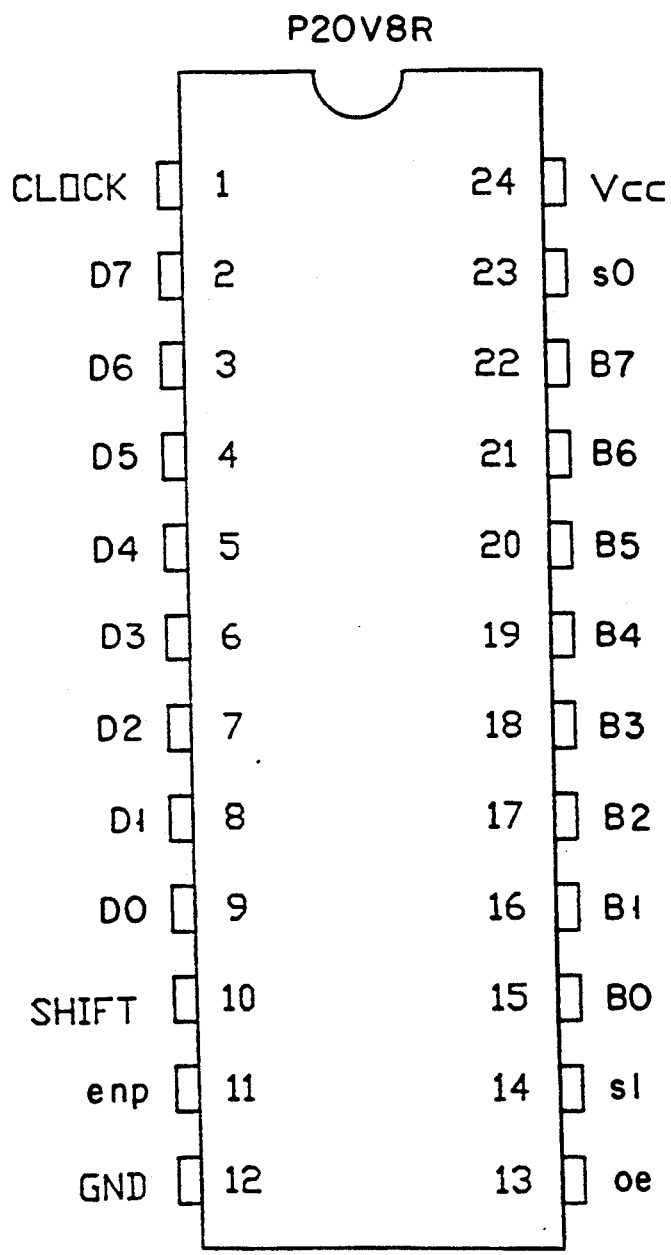
FIGS. 20-22 illustrate the modules constituting the barrel shifter of FIG. 19, respectively.

Device TENTA 0 (FIG. 20) -
Reduced Equations:

```
B7 : = (D7 & enp & !shift
        # B3 & enp & !s0 & s1 & shift
        # B5 & enp & s0 & !s1 & shift
        # B6 & enp & !s0 & !s1 & shift
        # B7 & !enp);
B6 : = (D6 & enp & !shift
        # B2 & enp & !s0 & s1 & shift
        # B4 & enp & s0 & !s1 & shift
        # B5 & enp & !s0 & !s1 & shift
        # B6 & !enp);
B5 : = (D5 & enp & !shift
        # B1 & enp & !s0 & s1 & shift
        # B3 & enp & s0 & !s1 & shift
        # B4 & enp & !s0 & !s1 & shift
        # B5 & !enp);
B4 : = (D4 & enp & !shift
        # B0 & enp & !s0 & s1 & shift
        # B2 & enp & s0 & !s1 & shift
        # B3 & enp & !s0 & !s1 & shift
        # B4 & !enp);
B3 : = (D3 & enp & !shift
        # B1 & enp & s0 & !s1 & shift
        # B2 & enp & !s0 & !s1 & shift
        # B3 & !enp);
B2 : = (D2 & enp !shift
        # B0 & enp & s0 & !s1 & shift
        # B1 & enp & !s0 & !s1 & shift
        # B2 & !enp);
B1 : = (D1 & enp & !shift # B0 & enp & !s0 & !s1 & shift # B1 & !enp);
B0 : = (D1 & enp & !shift # B0 & !enp);
```

Figure 21:
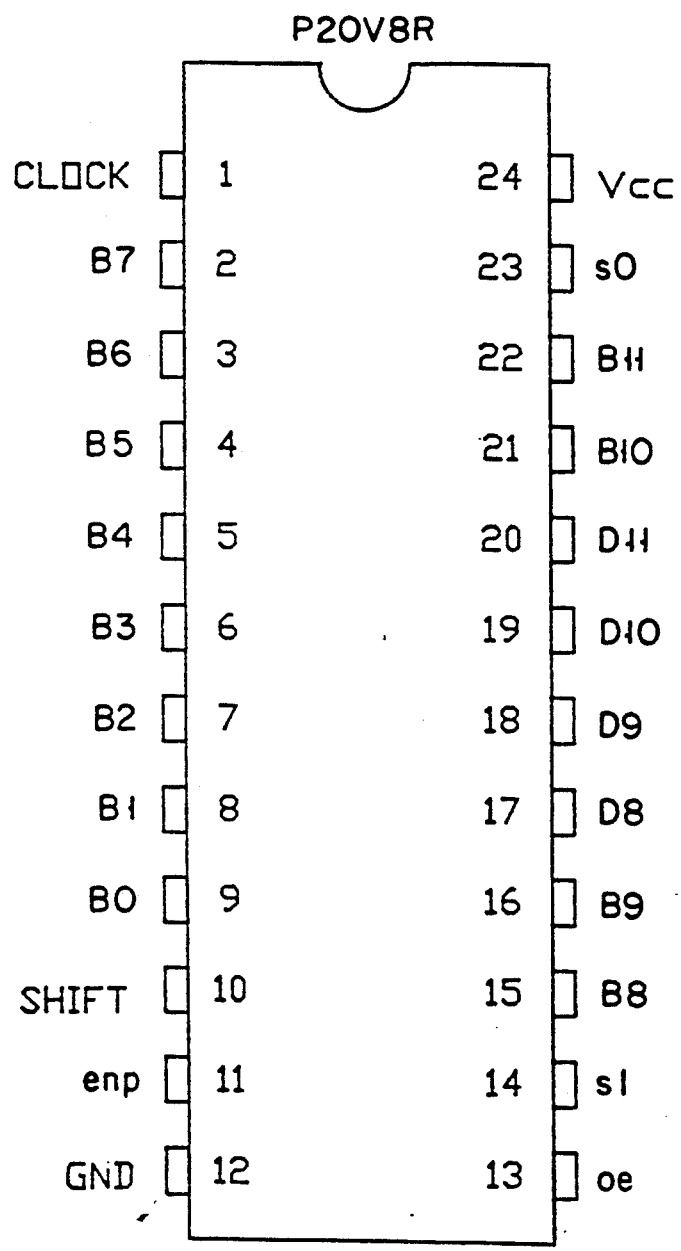

Device TENTA 1 (FIG. 21) -
Reduced Equations

```
B11 : = (D11 & enp & !shift
         # B3 & enp & s0 & s1 & shift
         # B7 & enp & !s0 & s1 & shift
         # B9 & enp & s0 & !s1 & shift
         # B10 & enp & !s0 & !s1 & shift
         # B11 & !enp);
B10 : = (D10 & enp & !shift
         # B2 & enp & s0 & s1 & shift
         # B6 & enp & !s0 & s1 & shift
         # B8 & enp & s0 & !s1 & shift
         # B9 & enp & !s0 & !s1 & shift
         # B10 & !enp);
B9 : = (D9 & enp & !shift
        # B1 & enp & s0 & s1 & shift
        # B5 & enp & !s0 & s1 & shift
        # B7 & enp & s0 & !s1 & shift
        # B8 & enp & !s0 & !s1 & shift
        # B9 & !enp);
B8 : = (D8 & enp & !shift
        # B0 & enp & s0 & s1 & shift
        # B4 & enp & !s0 & s1 & shift
        # B6 & enp & s0 & !s1 & shift
        # B7 & enp & !s0 & !s1 & shift
        # B8 & !enp);
```

Figure 22:
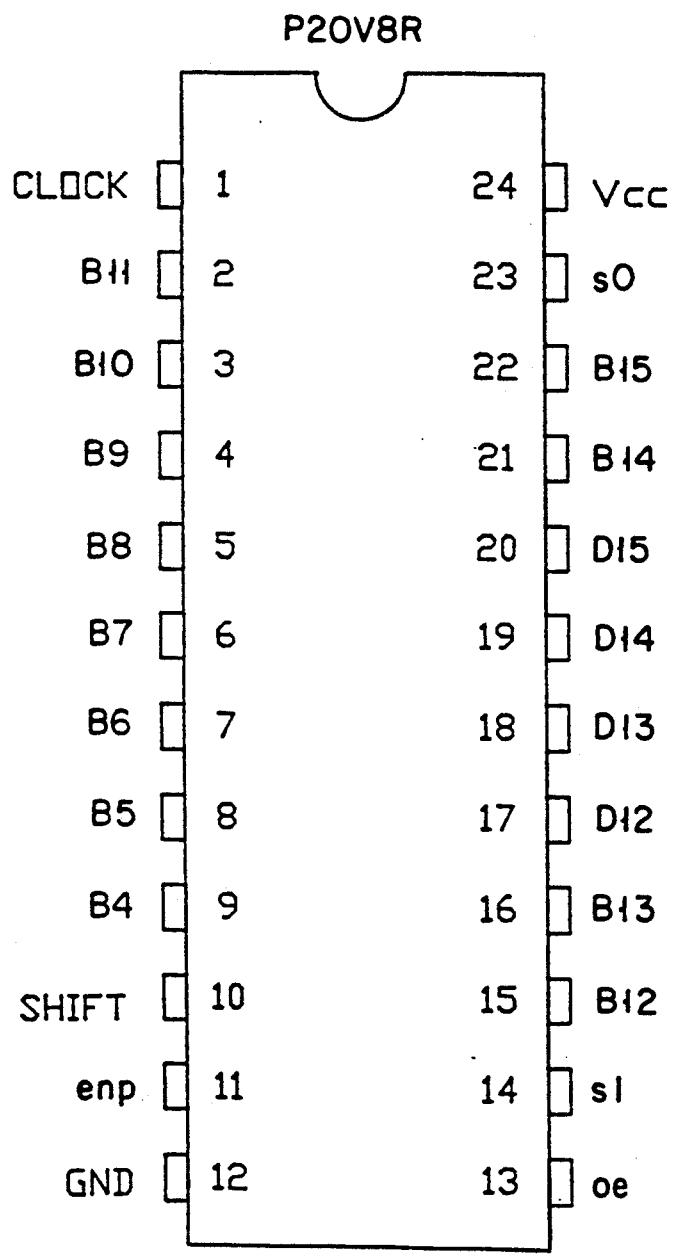

Device TENTA 2 (FIG. 22) -
Reduced Equations

-continued
```
B15 := (D15 & enp & !shift
      # B7 & enp & s0 & s1 & shift
      # B11 & enp & !s0 & s1 & shift
      # B13 & enp & s0 & !s1 & shift
      # B14 & enp & !s0 & !s1 & shift
      # B15 & !enp);
B14 := (D14 & enp & !shift
      # B6 & enp & s0 & s1 & shift
      # B10 & enp & !s0 & s1 & shift
      # B12 & enp & s0 & !s1 & shift
      # B13 & enp & !s0 & !s1 & shift
      # B14 & !enp);
B13 := (D13 & enp & !shift
      # B5 & enp & s0 & s1 & shift
      # B9 & enp & !s0 & s1 & shift
      # B11 & enp & s0 & !s1 & shift
      # B12 & enp & !s0 & !s1 & shift
      # B13 & !enp);
B12 := (D12 & enp & !shift
      # B4 & enp & s0 & s1 & shift
      # B8 & enp & !s0 & s1 & shift
      # B10 & enp & s0 & !s1 & shift
      # B11 & enp & !s0 & !s1 & shift
      # B12 & !enp);
```

Bit Sorter

Next, the bit sorter circuit will be described with reference to FIG. 23. The data sent from the barrel shifter are mixed with the data of the line buffer and written back to the line buffer. Depending on the speed mode, the combination resulting from the mixing of new data into the data read from the line buffer varies. The sorting of the outputs of the line buffer and the barrel shifter varies as shown in Table 2.

TABLE 2

| | s15 | s14 | s13 | s12 | s11 | s10 | s09 | s08 | s07 | s06 | s05 | s04 | s03 | s02 | s01 | s00 |
|---|---|---|---|---|---|---|---|---|---|---|---|---|---|---|---|---|
| B08 | — | — | — | — | — | — | — | — | — | — | — | — | — | — | — | 8 |
| B09 | — | — | — | — | — | — | — | — | — | — | — | — | — | 8 | — | — |
| B10 | — | — | — | — | — | — | — | — | — | — | 8 | — | — | — | — | — |
| B11 | — | — | — | — | — | — | — | — | 8 | — | — | — | — | — | — | — |
| B12 | — | — | — | — | — | — | — | 8 | — | — | — | — | — | — | — | 4 |
| B13 | — | — | — | — | — | 8 | — | — | — | — | 4 | — | — | — | — | — |
| B14 | — | — | — | 8 | — | — | — | 4 | — | — | — | — | — | — | — | 2 |
| B15 | — | 8 | — | 4 | — | — | — | 2 | — | — | — | — | — | — | — | 1 |
| L00 | — | — | — | — | — | — | — | — | — | — | — | — | — | — | A | |
| L01 | — | — | — | — | — | — | — | — | — | — | — | — | — | O | | |
| L02 | — | — | — | — | — | — | — | — | — | — | — | — | A | | | |
| L03 | — | — | — | — | — | — | — | — | — | — | — | O | | | | |
| L04 | — | — | — | — | — | — | — | — | — | — | A | | | | | |
| L05 | — | — | — | — | — | — | — | — | — | O | | | | | | |
| L06 | — | — | — | — | — | — | — | — | A | | | | | | | |
| L07 | — | — | — | — | — | — | — | O | | | | | | | | |
| L08 | — | — | — | — | — | — | A | | | | | | | | | |
| L09 | — | — | — | — | — | O | | | | | | | | | | |
| L10 | — | — | — | — | A | | | | | | | | | | | |
| L11 | — | — | — | O | | | | | | | | | | | | |
| L12 | — | — | A | | | | | | | | | | | | | |
| L13 | — | O | | | | | | | | | | | | | | |
| L14 | A | | | | | | | | | | | | | | | |
| L15 | | | | | | | | | | | | | | | | |

In Table 2, B8-15 represent the outputs of the barrel shifter and L0-15 represent the outputs of the line buffer. The inputs of the sorter are denoted by sxx, and the outputs by Sxx. The outputs of the sorter are written back to the line buffer. For example, since the input S15 is always connected to L14, it is indicated by A:Always. As for S14, it is connected to B15 in the eight-times-speed mode, but connected to L13 in the other modes, i.e., the one, two-, and four-times-speed modes. Thus, "8" is indicated for B15. O:Other means that S14 is connected to L13 in other cases. This circuit is imple-mented by means of two GAL20V8s and one 74LS374 (8-bit latch). For the logical contents of the GAL, reference is made to SQUID0 and SQUID1.

Figure 24:
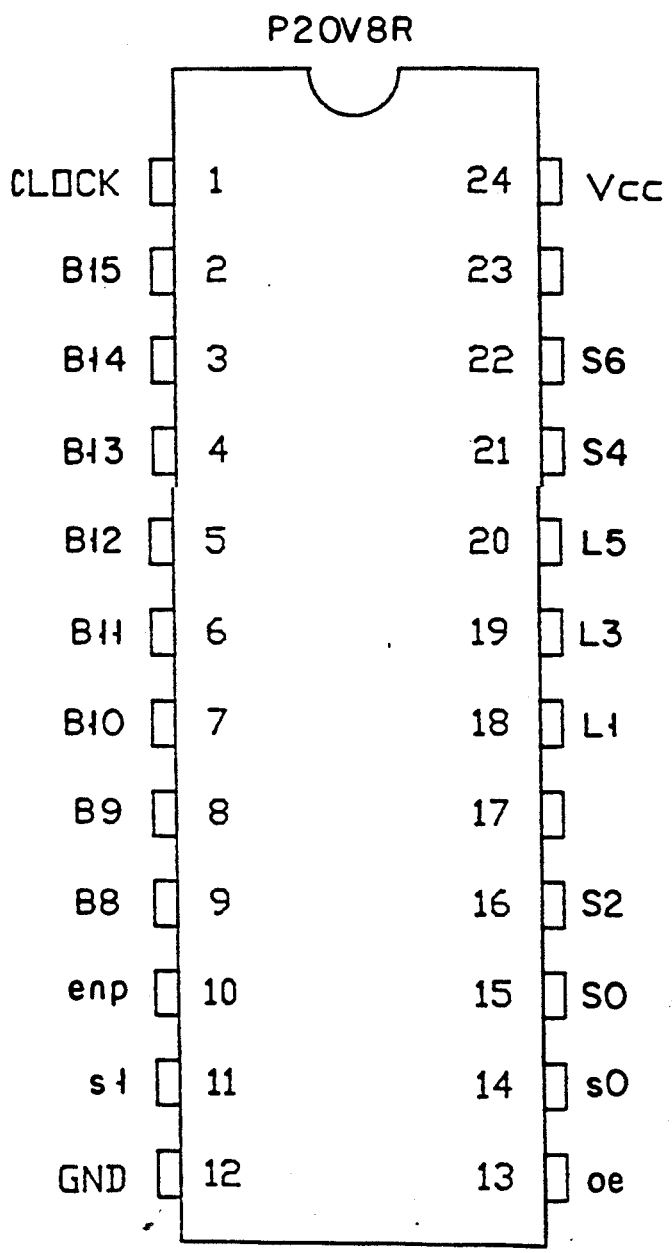
FIGS. 24 and 25 illustrate the modules constituting the bit sorter circuit of FIG. 23.
Figure 25:
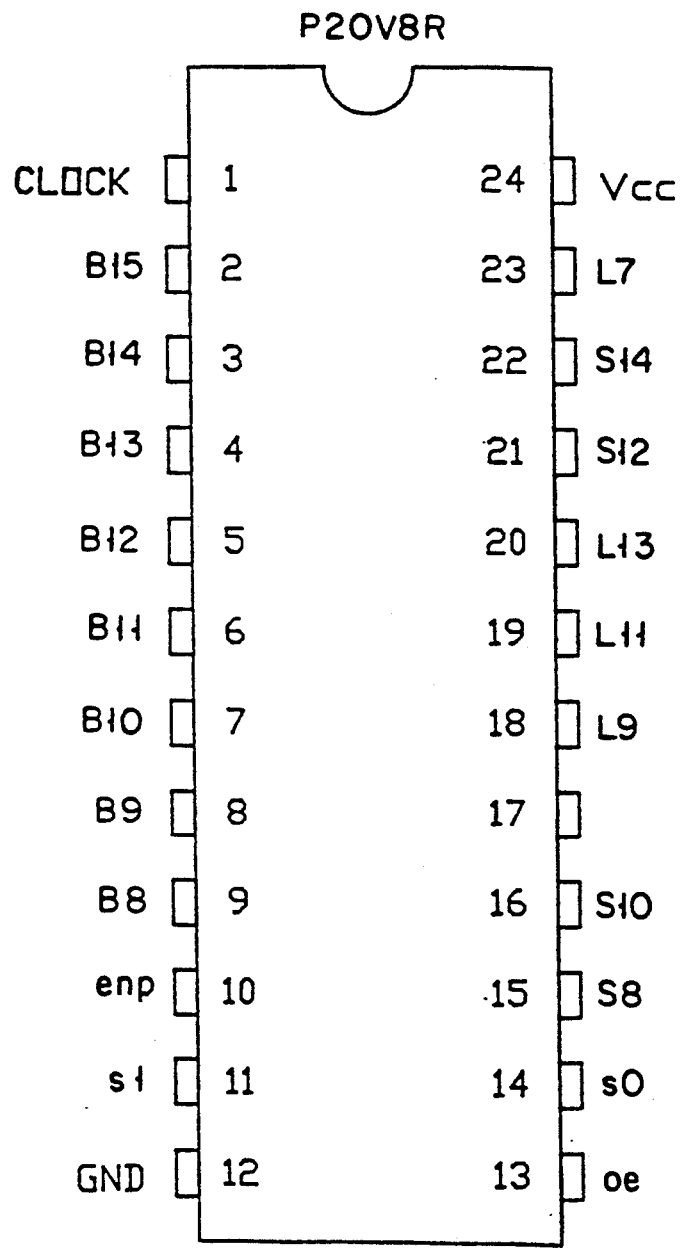

```
Device SQUID0 (FIG. 24) -
Reduced Equations:
    S6 := B11 & enp & s0 & s1
        # L5 & enp & !s0
        # L5 & enp & !s1
        # S6 & !enp);
    S4 := (B10 & enp & s0 & s1
        # B13 & enp & !s0 & s1
        # L3 & enp & !s1
        # S4 & !enp);
    S2 := (B9 & enp & s0 & s1 # L1 & enp &
          !s0 # L1 & enp & !s1 # S2 & !enp);
    S0 := (B8 & enp & s0 & s1
        # B12 & enp & !s0 & s1
        # B14 & enp & !s0 & !s1
        # B15 & enp & !s0 & !s1
        # S0 & !enp);
Device SUID1 (FIG. 25) -
Reduced Equations
    SF14 := (B15 & enp & s0 & s1
        # L13 & enp & !s0
        # L13 & enp & !s1
        # S14 & !enp);
    S12 := (B14 & enp & s0 & s1
        # B15 & enp & !s0 & s1
        # L11 & enp & !s1
        # S12 & !enp);
    S10 := (B13 & enp & s0 & s1
        # L9 & enp & !s0
        # L9 & enp & !s1
        # S10 & !enp);
    S8 := (B12 & enp & s0 & s1
        # B14 & enp & !s0 & s1
        # B15 & enp & !s0 & !s1
        # L7 & enp & !s0 & !s1
        # S8 & !enp);
```

Bit Aligner

Figure 26:
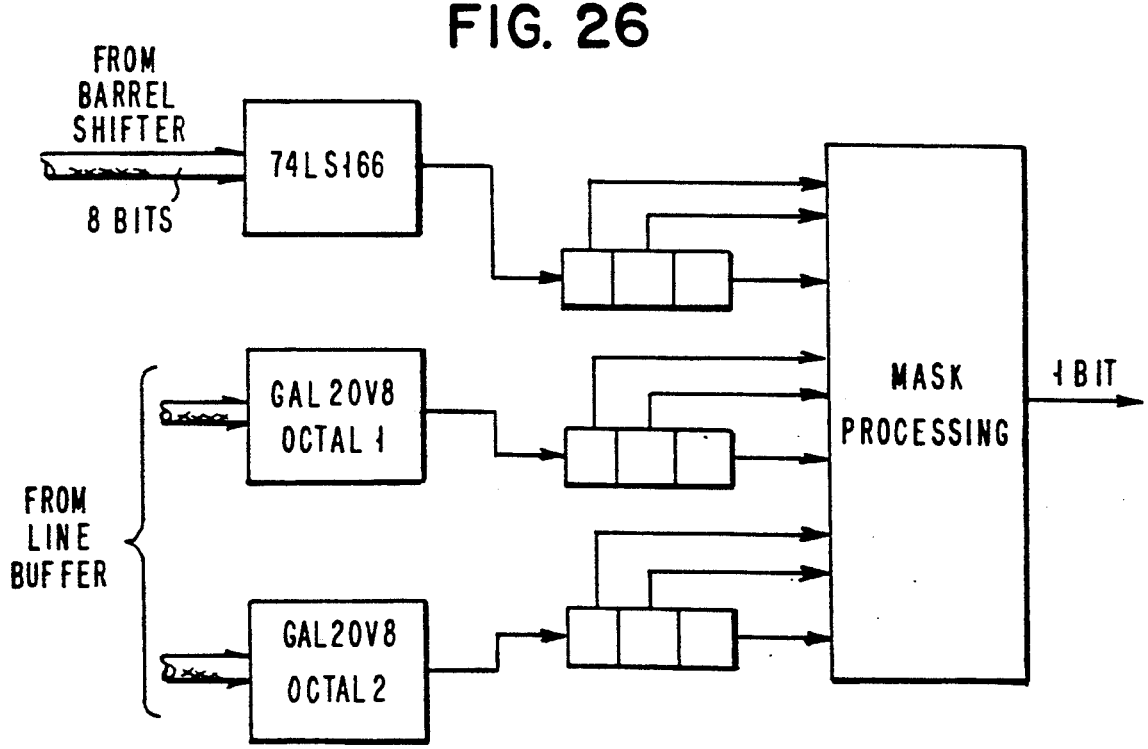
FIG. 26 illustrates a bit aligner.

Finally, the bit aligner will be described with reference to FIG. 26. If the one-, two-, four-, and eight-times-speed modes of the line buffer are enabled to be switched, a circuit is required for collecting and aligning the data interleaved in the line buffer. The bit aligner makes a bit stream of three bits (Process 2), using the eight output bits of the barrel shifter (Process 1) and the 16 output bits of the line buffer.

Operation of the bit aligner for the first line is shown in Table 3.

TABLE 3

|     | a07 | a06 | a05 | a04 | a03 | a02 | a01 | a00 |
| --- | --- | --- | --- | --- | --- | --- | --- | --- |
| B08 | —   | —   | —   | —   | —   | —   | —   | A   |
| B09 | —   | —   | —   | —   | —   | —   | A   |     |
| B10 | —   | —   | —   | —   | —   | A   |     |     |
| B11 | —   | —   | —   | —   | A   |     |     |     |
| B12 | —   | —   | —   | A   |     |     |     |     |
| B13 | —   | —   | A   |     |     |     |     |     |
| B14 | —   | A   |     |     |     |     |     |     |
| B15 | A   |     |     |     |     |     |     |     |

In Table 3 Axx represents the output of the bit aligner, and axx represents the input. For the first line, the output of the barrel shifter is directly used. Regardless of the speed mode, it becomes an 8-bit parallel-in serial-out shift register. A07 becomes the output of the bit aligner. A represents A:Always.

Operation of the bit aligner for the second line is shown in Table 4.

TABLE 4

|     | a17 | a16 | a15 | a14 | a13 | a12 | a11 | a10 |
| --- | --- | --- | --- | --- | --- | --- | --- | --- |
| L00 | 1   | 2   | —   | 4   | —   | —   | —   | 8   |
| L01 | —   | —   | —   | —   | —   | —   | —   |     |
| L02 | —   | —   | —   | —   | —   | —   | 8   |     |
| L03 | —   | —   | —   | —   | —   | —   |     |     |
| L04 | —   | —   | 4   | —   | —   | 8   |     |     |
| L05 | —   | —   | —   | —   | —   |     |     |     |
| L06 | —   | —   | —   | —   | 8   |     |     |     |
| L07 | —   | —   | —   | —   |     |     |     |     |
| L08 | 2   | 4   | —   | 8   |     |     |     |     |
| L09 | —   | —   | —   |     |     |     |     |     |
| L10 | —   | —   | 8   |     |     |     |     |     |
| L11 | —   | —   |     |     |     |     |     |     |
| L12 | 4   | 8   |     |     |     |     |     |     |
| L13 | —   |     |     |     |     |     |     |     |
| L14 | 8   |     |     |     |     |     |     |     |
| L15 |     |     |     |     |     |     |     |     |

It will be seen from Table 4, from the second line onward, the operation changes according to the switching of the speed mode. In the eight-times-speed mode, it becomes an 8-bit parallel-in serial-out shift register. For the four-times-speed mode, since the number of bits that can be fetched at a time from the line buffer is four, this bit aligner equivalently becomes a 4-bit shift register. For the double-speed mode, since the number of bits that can be fetched at a time from the line buffer is two, this bit aligner equivalently becomes a 2-bit shift register. For the normal speed mode, since the number of bits that can be fetched at a time from the line buffer is one, this bit aligner effectively becomes a single latch. The output of the bit aligner is A17. Operation of the bit aligner for the third line is shown in Table 5.

TABLE 5

|     | a27 | a26 | a25 | a24 | a23 | a22 | a21 | a20 |
| --- | --- | --- | --- | --- | --- | --- | --- | --- |
| L00 | —   | —   | —   | —   | —   | —   | —   | —   |
| L01 | 1   | 2   | —   | 4   | —   | —   | —   | 8   |
| L02 | —   | —   | —   | —   | —   | —   | —   |     |
| L03 | —   | —   | —   | —   | —   | —   | 8   |     |
| L04 | —   | —   | —   | —   | —   | —   |     |     |
| L05 | —   | —   | 4   | —   | —   | 8   |     |     |
| L06 | —   | —   | —   | —   | —   |     |     |     |
| L07 | —   | —   | —   | —   | 8   |     |     |     |
| L08 | —   | —   | —   | —   |     |     |     |     |
| L09 | 2   | 4   | —   | 8   |     |     |     |     |
| L10 | —   | —   | —   |     |     |     |     |     |
| L11 | —   | —   | 8   |     |     |     |     |     |

TABLE 5-continued

|     | a27 | a26 | a25 | a24 | a23 | a22 | a21 | a20 |
| --- | --- | --- | --- | --- | --- | --- | --- | --- |
| L12 | —   | —   |     |     |     |     |     |     |
| L13 | 4   | 8   |     |     |     |     |     |     |
| L14 | —   |     |     |     |     |     |     |     |
| L15 | 8   |     |     |     |     |     |     |     |

It will be seen from Table 5 that the operation for the third line is substantially the same as for the second line, but the data fetched from the line buffer are different. The data to be fetched change in accordance with the switching of the speed mode. For the eight-times-speed mode, since eight bits of data can be fetched at a time from the line buffer, it becomes an 8-bit parallel-in serial-out shift register. For the four-times-speed mode, since the number of bits that can be fetched at a time from the line buffer is four, this bit aligner becomes a virtual 4-bit shift register. For the double-speed mode, since the number of bits that can be fetched at one time from the line buffer is two, this bit aligner becomes a virtual 2-bit shift register. For the normal speed mode, since the number of bits that can be fetched at a time from the line buffer is one, this bit aligner effectively becomes a single latch. The output of the bit aligner is A27.

This bit aligner circuit comprises two GAL modules and one TTL74LS166 (8-bit parallel-in serial-out shift register).

For the internal logic of the GAL, reference may be had to OCTAL 1 and OCTAL 2.

Figure 27:
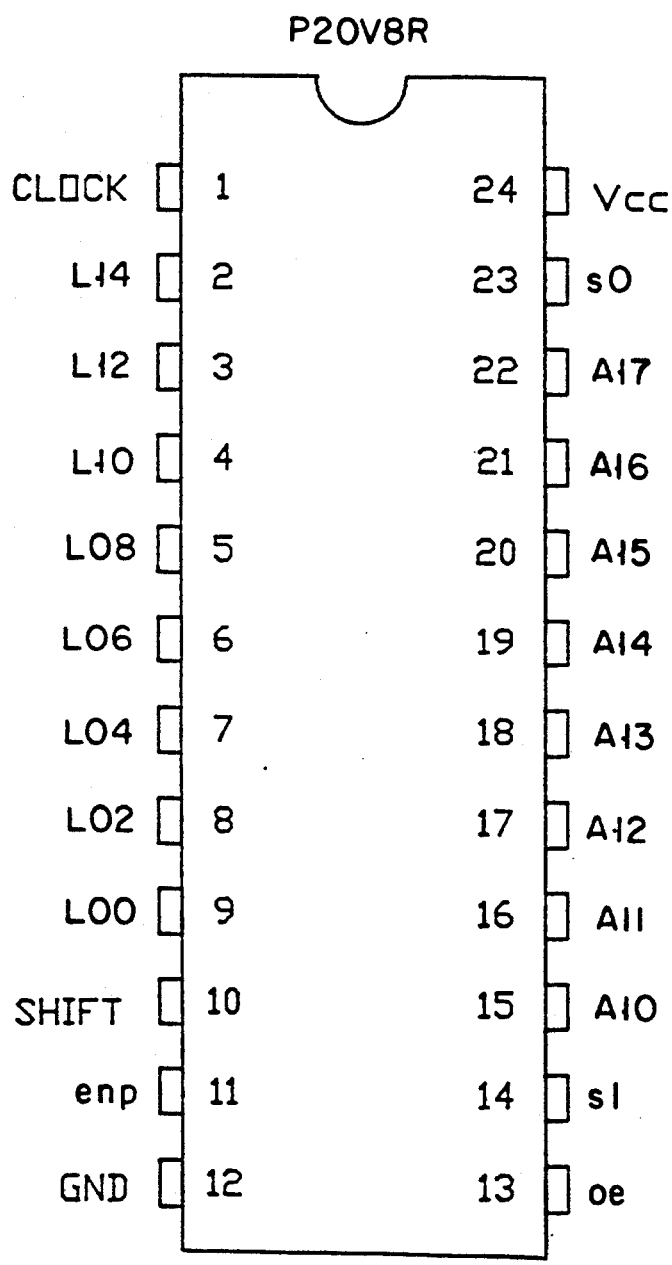
FIGS. 27 and 28 illustrate the modules constituting the bit aligner of FIG. 26.
Figure 28:
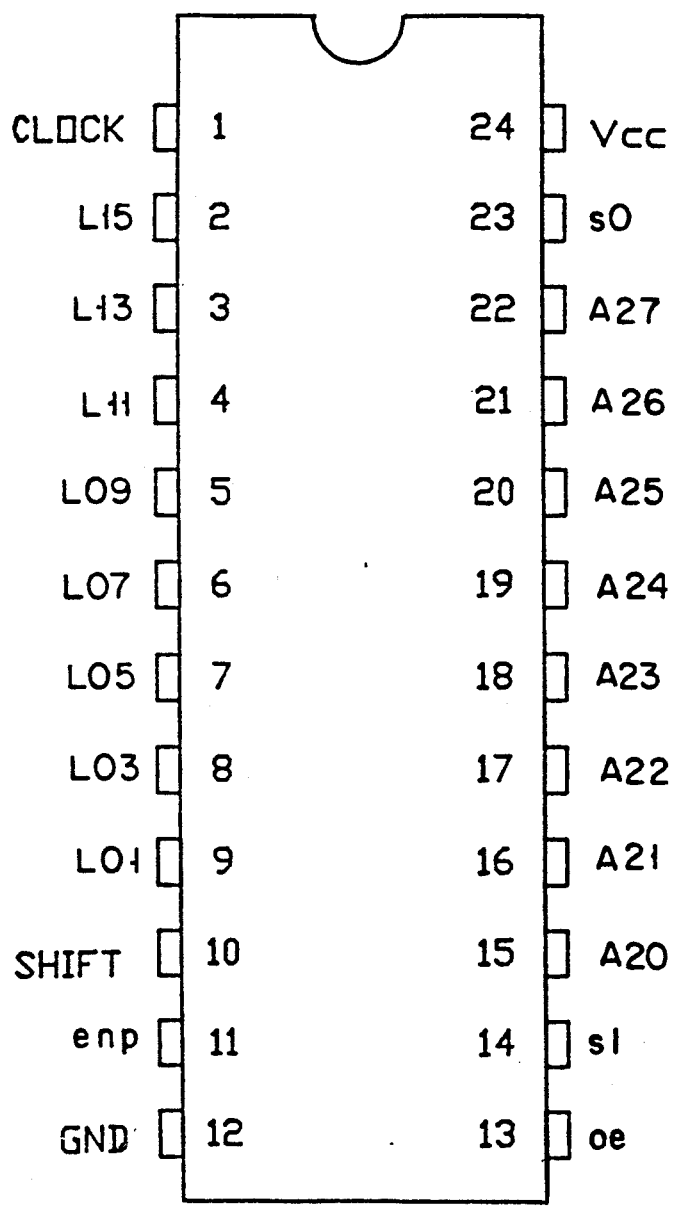

Device OCTAL 1 (FIG. 27) -
Reduced Equations:
A17 : = (A16 & enp & shift
    # L14 & enp & s0 & s1 & !shift
    # L12 & enp & !s0 & s1 & !shift
    # L08 & enp & s0 & !s1 & !shift
    # L00 & enp & !s0 & !s1 & !shift
    # A17 & !enp);
A16 : = (A15 & enp & shift
    # L12 & enp & s0 & s1 & !shift
    # L08 & enp & !s0 & s1 & !shift
    # L00 & enp & !s1 & !shift
    # A16 & !enp);
A15 : = (A14 & enp & shift
    # L10 & enp & s0 & !shift
    # L04 & enp & !s0 & !shift
    # A15 & !enp);
A14 : = (A14 & shift
    # L08 & enp & s0 & s1 & !shift
    # L00 & enp & !s0 & s1 & !shift
    # A14 & !enp);
A13 : = (A12 & enp & shift # L06 & enp & !shift # A13 & !enp);
A12 : = (A11 & enp & shift # L04 & enp & !shift # A12 & !enp);
A11 : = (A10 & enp & shift # L02 & enp & !shift # A11 & !enp);
A10 : = (L00 & enp & !shift # A10 & !enp);
Device OCTAL 2 (FIG. 28) -
Reduced Equations:
A27 : = (A26 & enp & shift
    # L15 & enp & s0 & s1 & !shift
    # L13 & enp & !s0 & s1 & !shift
    # L09 & enp & s0 & !s1 & !shift
    # L01 & enp & !s0 & !s1 & !shift
    # A27 & !enp);
A26 : = (A25 & enp & shift
    # L13 & enp & s0 & s1 & !shift
    # L09 & enp & !s0 & s1 & !shift
    # L01 & enp & !s1 & !shift
    # A26 & !enp);
A25 : = (A24 & enp & shift -continued

```
        # L11 & enp & s0 & !shift
        # L05 & enp & !s0 & !shift
        # A25 & !enp);
A24 : = (A24 & shift
        # L09 & enp & s0 & s1 & !shift
        # L01 & enp & !s0 & s1 !shift
        # A24 & !enp
A23 : = (A22 & enp & shift # L07 & enp &
        !shift # A23 & !enp);
A22 : = (A21 & enp & shift # L05 & enp &
        !shift # A22 & !enp);
A21 : = (A20 & enp & shift # L03 & enp &
        !shift # A21 & !enp);
A20 : = (L01 & enp & !shift # A20 &
        !enp);
```

It will be seen from the foregoing description that this invention makes possible the implementation of a line buffer function that can serve any image width, requires a minimum of hardware, and provides for high-speed processing.

What is claimed is:

1. A system for processing image data in the form of bits arranged in parallel lines and in which lines N bits are arranged in the line direction, comprising:
   (a) Random Access Memory (RAM) means for storing said image data, having storage locations defined by a series of bit addresses in one direction and a bit width in a direction normal to said one direction, and comprising n small buffers provided by logically dividing the bit width of said RAM means into n portions, where n is an integer not smaller than 2 and is a divisor of N;
   (b) means for sequentially fetching consecutive sets of n bits from a line of image data in the line direction of the image data for storing in said RAM means:
   (c) means for sequentially selecting each of N/n addresses of the RAM means for successively storing said sequentially fetched consecutive sets of n bits;
   (d) means for discarding one bit from an end of each set of data bits stored in each of said n small buffers at a selected address and shifting the storage location positions of the remaining data bits of each of said sets of data bits by one bit in the bit width direction of the RAM means to produce a vacant bit position in each of said sets of data bits at the selected address; and
   (e) means for placing one of the n bits fetched by said fetching means in the vacant bit position in each of said sets of data bits and respectively storing each of said sets of data bits including said fetched bits in the n small buffers in said RAM means at said selected address.

2. An image processing system as set forth in claim 1 wherein at least two values are specifiable as the divisors of said RAM means in determining the number of small buffers provided and said means (b) to (e) are provided for the number of small buffers determined by each of said specifiable divisors.

3. An image processing system as set forth in claim 1 further comprising:
   (f) means for fetching the image data one bit at a time,
   (g) means for sequentially selecting N addresses of the RAM means,
   (h) means for discarding one of the data bits from an end of each set of data bits stored at each selected address and shifting the storage location positions of the remaining data bits of said each set of data bits by one bit in the bit width direction of the RAM means to produce a vacant bit position in said each set of data bits, and
   (i) means for inserting one bit fetched from said means (f) into the vacant bit positions of said each set of data bits of said selected addresses.

4. A system for processing data in the form of a bit stream representing the lines of an image, comprising:
   (a) Random Access Memory (RAM) means, having storage bit positions defined by a series of bit addresses in one direction and a bit width in a direction normal to said one direction, for storing said image data bits in n small buffers provided by logically dividing the bit width of said RAM means into n portions, where n is an integer not smaller than 2;
   (b) means for sequentially fetching consecutive sets of n bits of the image data bit stream;
   (c) means for sequentially selecting, from successive addresses of said RAM means, n equally-spaced bit positions in the bit width direction, with each of said bit positions respectively disposed in each of said n small buffers, and for producing a signal indicative of a selection;
   (d) means, responsive to a signal indicative of a selection by said selecting means, for discarding the bit at each position selected by said selecting means and shifting the remaining bits in the bit width direction, and for producing a signal indicative of a selection; and
   (e) means, responsive to a signal indicative of a shifting of said remaining bits, for disposing the n bits fetched by said fetching means consecutively in the respective vacant bit positions and storing said n bits and remaining bits sequentially in respective addresses in said RAM means, after each shifting, whereby each of said small buffers is sequentially filled with bits representing a portion of said lines of image data.

5. A system as in claim 4 wherein said fetching means (b) comprises latch means for sequentially receiving n bits of the image data bit stream, and said disposing means (e) comprises:
   means for sequentially reading to said latch means the remaining bits from each address of said RAM means upon each shifting thereof such that the n bits are disposed in said vacant bit positions; and
   means for sequentially writing the contents of said latch means back into the respective addresses in said RAM means from which the remaining bits in said contents were read.

6. A system as in claim 5 wherein said means for sequentially reading to said latch means comprises means for reading said bits through an AND gate and an OR gate.

7. A system as in claim 5 wherein said fetching means (b) further comprises shift register means for sequentially transferring n bits of the image data bit stream to said latch means.

8. A system as in claim 7 wherein said fetching means (b) further comprises means for transferring said n bits to said latch means through an AND gate and an OR gate.

9. A system as in claim 5 wherein said fetching means (b) further comprises a barrel shifter.

10. A system as in claim 9 wherein said disposing means (e) further comprises bit sorter means for receiving the n bits of the image data bit stream from said barrel shifter and mixing said n bits with said remaining bits for storage in said RAM means.

11. A system as in claim 4 wherein said disposing means (e) comprises:
   read-in register means for sequentially receiving the contents of the storage bit positions read out from each address of said RAM means;
   write-in register means for sequentially receiving the contents of said read-in register means, after the discarding and shifting of the bits therein by said discarding and shifting means, and for receiving the n bits fetched by said fetching means in the bit positions vacated in the bit discarding operation; and
   means for sequentially writing the contents of said write-in register means into the respective addresses of said RAM means.

12. A system as in claim 4 further comprising mask processing means for processing the bits in said small buffers representing portions of said lines of image data, said processing means comprising a plurality of shift registers.

13. A system as in claim 12 wherein said plurality of shift registers comprise a set of shift registers, each having means for receiving n bits in parallel and having tail bits for mask processing.

14. A system as in claim 13 wherein and all but one of said set of shift registers receives sets of n bits representing corresponding portions of successive lines of said image data from said RAM means.

15. A system as in claim 13 wherein said mask processing means further comprises means for processing said tail bits and producing an output, and circuit means for receiving and processing the output of said tail bit processing means and producing result bits in accordance therewith.

16. A system as in claim 15 wherein said RAM means produces an output and said fetching means (b) further comprises a barrel shifter which produces an output and said mask processing means further comprises bit aligner means for receiving the outputs of said barrel shifter and said RAM means and producing an output to said circuit means.

17. A system as in claim 4 wherein n is an even integer, N is the bit width of the lines of said image, and said RAM means comprises a bit width of N and N/n addresses.

18. A method for processing data in the form of a bit stream representing the lines of an image, comprising the steps of:
   providing a Random Access Memory (RAM) having storage bit positions defined by a series of bit addresses in one direction and a bit width in a direction normal to said one direction;
   storing said image data in n small buffers in said RAM, provided by logically dividing the bit width of said RAM into n portions, where n is an integer not smaller than 2;
   sequentially fetching consecutive sets of n bits of the image data bit stream;
   sequentially selecting, from successive addresses of said RAM means, n equally-spaced bit positions in the bit width direction, with each of said bit positions respectively disposed in each of said n small buffers;
   upon each selection, discarding the bit at each position selected and shifting the storage location positions of the remaining bits by one bit in the bit width direction to produce a vacant bit position in each of said n small buffers; and
   upon each shifting of said remaining bits, disposing the n bits fetched by said fetching means consecutively in the respective vacant bit positions; and
   storing said n bits and remaining bits sequentially in respective addresses in said RAM means, after each shifting, whereby each of said small buffers is sequentially filled with bits representing a portion of said lines of image data.

19. A method as in claim 18 further comprising the steps of:
   providing a latch for sequentially receiving the sequentially fetched consecutive sets of n bits of the image data bit stream;
   sequentially reading to said latch the remaining bits from each address of said RAM upon each shifting thereof such that said latch contains said remaining bits with the n bits disposed in said vacant bit positions; and
   sequentially writing the contents of said latch back into the respective addresses in said RAM from which the remaining bits in said contents were read.

20. A method as in claim 18 wherein n is an even integer, N is the bit width of the lines of said image, and said RAM comprises a bit width of N and N/n addresses.

* * * * *